US009201950B2

(12) United States Patent  
Hedloy

(10) Patent No.: US 9,201,950 B2  
(45) Date of Patent: *Dec. 1, 2015

(54) METHOD, SYSTEM AND COMPUTER READABLE MEDIUM FOR ADDRESSING HANDLING FROM AN OPERATING SYSTEM

(75) Inventor: Atle Hedloy, Luxembourg (LU)

(73) Assignee: Arendi S.A.R.L., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 12/963,744

(22) Filed: Dec. 9, 2010

(65) Prior Publication Data

US 2011/0072029 A1    Mar. 24, 2011
US 2013/0191406 A2    Jul. 25, 2013

Related U.S. Application Data

(63) Continuation of application No. 11/745,186, filed on May 7, 2007, which is a continuation of application No. 09/390,303, filed on Sep. 3, 1999, now Pat. No. 7,272,604.

(51) Int. Cl.
*G06F 17/30* (2006.01)
*G06F 3/0482* (2013.01)
(Continued)

(52) U.S. Cl.
CPC ........ *G06F 17/30634* (2013.01); *G06F 3/0482* (2013.01); *G06F 3/04842* (2013.01); *G06F 17/30011* (2013.01); *G06F 17/30067* (2013.01);
(Continued)

(58) Field of Classification Search
USPC .................................. 707/758, 759, 765, 767
See application file for complete search history.

(56) References Cited

U.S. PATENT DOCUMENTS 3,350,695 A    10/1967    Kaufman et al. .......... 340/172.5
4,270,182 A     5/1981    Asija .............................. 364/900

(Continued)

FOREIGN PATENT DOCUMENTS

EP    0 093 250 A2    9/1983    .............. G06F 17/27
EP    0520926        12/1992    ................ G06F 9/44

(Continued)

OTHER PUBLICATIONS

U.S. Appl. No. 12/841,302, Interview Summary, 3 pages, Dec. 20, 2010.

(Continued)

*Primary Examiner* — Khanh Pham
(74) *Attorney, Agent, or Firm* — Sunstein Kann Murphy & Timbers LLP

(57) ABSTRACT

A method, system and computer readable medium for information handling within an operating system, including providing a record retrieval program; providing an input device within a window or screen of the operating system and configured to enter an execute command which initiates a record retrieval from local and remote information sources using the record retrieval program; using the record retrieval program to enter first information into search fields provided in the record retrieval program; entering the execute command using the input device after the step of entering the first information; searching, using the record retrieval program, the local and remote information sources for second information associated with the first information; and displaying the second information in the record retrieval program, when one of the local and remote information sources includes second information associated with the first information.

14 Claims, 17 Drawing Sheets

(51) Int. Cl.
*G06F 3/0484* (2013.01)
*H04L 29/08* (2006.01)

(52) U.S. Cl.
CPC .......... *G06F 17/30424* (2013.01); *H04L 67/10* (2013.01); *Y10S 707/99943* (2013.01); *Y10S 707/99953* (2013.01)

(56) References Cited

U.S. PATENT DOCUMENTS

| | | | |
|---|---|---|---|
| 4,453,217 A | 6/1984 | Boivie | 364/300 |
| 4,674,065 A | 6/1987 | Lange et al. | 364/900 |
| 4,969,097 A | 11/1990 | Levin | 364/900 |
| 4,972,349 A | 11/1990 | Kleinberger | 364/900 |
| 5,226,117 A | 7/1993 | Miklos | 395/157 |
| 5,267,155 A | 11/1993 | Buchanan et al. | 364/419.14 |
| 5,331,555 A | 7/1994 | Hashimoto et al. | 364/419.07 |
| 5,355,472 A | 10/1994 | Lewis | 395/600 |
| 5,375,200 A | 12/1994 | Dugan et al. | 395/159 |
| 5,388,150 A | 2/1995 | Schneyer et al. | 379/67 |
| 5,392,386 A | 2/1995 | Chalas | 395/155 |
| 5,416,901 A | 5/1995 | Torres | 395/159 |
| 5,434,777 A | 7/1995 | Luciw | 364/419 |
| 5,477,447 A * | 12/1995 | Luciw et al. | 704/9 |
| 5,483,352 A | 1/1996 | Fukuyama et al. | 358/402 |
| 5,491,783 A | 2/1996 | Douglas et al. | 395/159 |
| 5,491,784 A | 2/1996 | Douglas et al. | 395/159 |
| 5,491,785 A | 2/1996 | Robson et al. | 395/162 |
| 5,493,105 A | 2/1996 | Desai | 235/375 |
| 5,495,565 A | 2/1996 | Millard et al. | 395/146 |
| 5,500,859 A | 3/1996 | Sharma et al. | 370/81 |
| 5,530,853 A | 6/1996 | Schell et al. | 395/600 |
| 5,546,447 A | 8/1996 | Skarbo et al. | 379/142 |
| 5,566,330 A | 10/1996 | Sheffield | 395/600 |
| 5,576,955 A | 11/1996 | Newbold et al. | 395/795 |
| 5,577,239 A | 11/1996 | Moore et al. | 395/603 |
| 5,579,467 A | 11/1996 | Capps | 395/768 |
| 5,587,911 A | 12/1996 | Asano et al. | 364/444.2 |
| 5,606,712 A | 2/1997 | Hidaka | 395/800 |
| 5,623,652 A | 4/1997 | Vora et al. | 395/610 |
| 5,628,004 A | 5/1997 | Gormley et al. | 395/615 |
| 5,634,121 A | 5/1997 | Tracz et al. | 395/602 |
| 5,640,565 A | 6/1997 | Dickinson | 395/683 |
| 5,644,735 A * | 7/1997 | Luciw et al. | 715/708 |
| 5,666,502 A | 9/1997 | Capps | 345/352 |
| 5,708,804 A | 1/1998 | Goodwin et al. | 395/603 |
| 5,724,597 A | 3/1998 | Cuthberson et al. | 395/793 |
| 5,732,229 A | 3/1998 | Dickinson | 395/334 |
| 5,732,395 A | 3/1998 | Silverman | 704/260 |
| 5,734,871 A | 3/1998 | Kleinerman et al. | 395/500 |
| 5,737,726 A | 4/1998 | Cameron et al. | 705/7 |
| 5,742,905 A | 4/1998 | Pepe et al. | 455/461 |
| 5,754,306 A | 5/1998 | Taylor et al. | 358/400 |
| 5,754,636 A | 5/1998 | Bayless et al. | 379/142 |
| 5,761,656 A | 6/1998 | Ben-Shachar | 707/4 |
| 5,761,663 A | 6/1998 | Lagarde et al. | 707/10 |
| 5,774,887 A | 6/1998 | Wolff et al. | 707/1 |
| 5,778,367 A | 7/1998 | Wesinger, Jr. et al. | 707/10 |
| 5,781,189 A | 7/1998 | Holleran et al. | 345/335 |
| 5,787,451 A | 7/1998 | Mogilevsky | 707/533 |
| 5,790,532 A | 8/1998 | Sharma et al. | 370/286 |
| 5,793,972 A | 8/1998 | Shane | 395/200.49 |
| 5,794,228 A | 8/1998 | French et al. | 707/2 |
| 5,794,259 A | 8/1998 | Kikinis | 707/507 |
| 5,799,302 A | 8/1998 | Johnson et al. | 707/7 |
| 5,805,810 A | 9/1998 | Maxwell | 395/200.36 |
| 5,805,886 A | 9/1998 | Skarbo et al. | 395/685 |
| 5,805,911 A | 9/1998 | Miller | 395/796 |
| 5,815,830 A | 9/1998 | Anthony | 707/6 |
| 5,826,257 A | 10/1998 | Snelling, Jr. | 707/4 |
| 5,835,089 A | 11/1998 | Skarbo et al. | 345/335 |
| 5,859,636 A | 1/1999 | Pandit | 345/335 |
| 5,860,073 A | 1/1999 | Ferrel et al. | 715/255 |
| 5,864,848 A | 1/1999 | Horvitz et al. | 707/6 |
| 5,873,107 A * | 2/1999 | Borovoy et al. | 715/234 |
| 5,873,108 A | 2/1999 | Goyal et al. | 707/507 |
| 5,884,309 A | 3/1999 | Vanechanos, Jr. | 707/10 |
| 5,893,093 A | 4/1999 | Wills | 707/5 |
| 5,896,321 A | 4/1999 | Miller et al. | 365/189.01 |
| 5,896,533 A | 4/1999 | Ramos et al. | 395/680 |
| 5,903,631 A | 5/1999 | Smith et al. | 379/90.01 |
| 5,907,838 A | 5/1999 | Miyasaka et al. | 707/4 |
| 5,913,214 A | 6/1999 | Madnick et al. | 707/10 |
| 5,923,848 A | 7/1999 | Goodhand et al. | 395/200.49 |
| 5,924,074 A | 7/1999 | Evans | 705/3 |
| 5,924,090 A | 7/1999 | Krellenstein | 707/5 |
| 5,926,808 A | 7/1999 | Evans et al. | 707/3 |
| 5,930,471 A | 7/1999 | Milewski et al. | 395/200.04 |
| 5,930,764 A | 7/1999 | Melchione et al. | 705/10 |
| 5,940,484 A | 8/1999 | DeFazio et al. | 379/142 |
| 5,946,647 A | 8/1999 | Miller et al. | 704/9 |
| 5,946,679 A | 8/1999 | Ahuja et al. | 707/3 |
| 5,963,964 A | 10/1999 | Nielsen | 707/501 |
| 5,999,938 A | 12/1999 | Bliss et al. | 707/102 |
| 6,005,549 A | 12/1999 | Forest | 345/157 |
| 6,006,218 A | 12/1999 | Breese et al. | 707/3 |
| 6,006,351 A | 12/1999 | Peretz et al. | 714/751 |
| 6,012,075 A | 1/2000 | Fein et al. | 707/540 |
| 6,018,571 A | 1/2000 | Langlois et al. | 379/207 |
| 6,021,403 A | 2/2000 | Horvitz et al. | 706/45 |
| 6,021,412 A | 2/2000 | Ho et al. | 707/104 |
| 6,026,398 A | 2/2000 | Brown et al. | 707/5 |
| 6,026,410 A | 2/2000 | Allen et al. | 707/104 |
| 6,028,605 A | 2/2000 | Conrad et al. | 345/354 |
| 6,029,171 A * | 2/2000 | Smiga et al. | 707/999.102 |
| 6,055,531 A | 4/2000 | Bennett et al. | 707/5 |
| 6,065,012 A | 5/2000 | Balsara et al. | 707/102 |
| 6,067,565 A | 5/2000 | Horvitz | 709/218 |
| 6,073,138 A | 6/2000 | De l'Etraz et al. | 707/104 |
| 6,081,788 A | 6/2000 | Appleman et al. | 705/14 |
| 6,085,201 A | 7/2000 | Tso | 707/505 |
| 6,085,206 A | 7/2000 | Domini et al. | 707/533 |
| 6,085,226 A | 7/2000 | Horvitz | 709/203 |
| 6,092,074 A | 7/2000 | Rodkin et al. | 707/102 |
| 6,108,686 A | 8/2000 | Williams | 709/202 |
| 6,112,099 A | 8/2000 | Ketola | 455/466 |
| 6,151,584 A | 11/2000 | Papierniak et al. | 705/10 |
| 6,175,831 B1 | 1/2001 | Weinreich et al. | |
| 6,178,411 B1 | 1/2001 | Reiter | 705/408 |
| 6,182,133 B1 | 1/2001 | Horvitz | 709/223 |
| 6,189,026 B1 | 2/2001 | Birrell et al. | 709/206 |
| 6,192,380 B1 | 2/2001 | Light et al. | 707/505 |
| 6,208,975 B1 | 3/2001 | Bull et al. | 705/14 |
| 6,209,005 B1 | 3/2001 | Harker et al. | 707/501 |
| 6,233,570 B1 | 5/2001 | Horvitz et al. | 706/11 |
| 6,247,029 B1 | 6/2001 | Kelley et al. | 707/507 |
| 6,247,043 B1 | 6/2001 | Bates et al. | 709/200 |
| 6,253,188 B1 | 6/2001 | Witek et al. | 705/14 |
| 6,260,035 B1 | 7/2001 | Horvitz et al. | 706/60 |
| 6,262,730 B1 | 7/2001 | Horvitz et al. | 345/337 |
| 6,285,987 B1 | 9/2001 | Roth et al. | 705/27 |
| 6,304,881 B1 | 10/2001 | Halim et al. | 707/201 |
| 6,317,761 B1 | 11/2001 | Landsman et al. | 707/513 |
| 6,323,853 B1 | 11/2001 | Hedloy | 345/339 |
| 6,338,957 B2 | 1/2002 | Onishi et al. | 435/108 |
| 6,349,299 B1 * | 2/2002 | Spencer et al. | 707/702 |
| 6,373,940 B2 | 4/2002 | Shaffer et al. | 379/355.02 |
| 6,377,965 B1 | 4/2002 | Hachamovitch et al. | 707/534 |
| 6,381,593 B1 | 4/2002 | Yano et al. | 707/3 |
| 6,385,592 B1 | 5/2002 | Angles et al. | 705/14 |
| 6,421,693 B1 | 7/2002 | Nishiyama et al. | 707/507 |
| 6,430,405 B1 | 8/2002 | Jambhekar et al. | 455/403 |
| 6,442,540 B2 | 8/2002 | Sako et al. | 707/3 |
| 6,499,021 B1 | 12/2002 | Abu-Hakima | 706/10 |
| 6,523,022 B1 | 2/2003 | Hobbs | 707/3 |
| 6,651,217 B1 | 11/2003 | Kennedy et al. | 715/507 |
| 6,711,585 B1 | 3/2004 | Copperman et al. | 707/104.1 |
| 6,738,615 B1 | 5/2004 | Chow et al. | 455/415 |
| 6,782,510 B1 | 8/2004 | Gross et al. | 715/533 |
| 6,826,407 B1 | 11/2004 | Helferich | 455/466 |
| 6,870,828 B1 | 3/2005 | Giordano, III | 370/352 |
| 6,928,425 B2 | 8/2005 | Grefenstette et al. | 707/2 |
| 7,039,599 B2 | 5/2006 | Merriman et al. | 705/14 |
| 7,051,019 B1 | 5/2006 | Land et al. | 707/4 |

(56) References Cited

U.S. PATENT DOCUMENTS

| | | | |
|---|---|---|---|
| 7,136,853 B1 | 11/2006 | Kohda et al. | 707/6 |
| 7,155,451 B1 | 12/2006 | Torres | 707/104.1 |
| 7,216,292 B1 | 5/2007 | Snapper et al. | 715/507 |
| 7,272,604 B1 | 9/2007 | Hedloy | 707/10 |
| 7,353,246 B1 | 4/2008 | Rosen et al. | 709/202 |
| 7,496,854 B2 | 2/2009 | Hedloy | 715/780 |
| 7,505,974 B2 | 3/2009 | Gropper | 707/10 |
| 7,509,349 B2 | 3/2009 | Celik | 707/200 |
| 7,917,843 B2 | 3/2011 | Hedloy | 715/230 |
| 7,921,356 B2 | 4/2011 | Hedloy | 715/230 |
| 8,306,993 B2 | 11/2012 | Hedloy | 707/769 |
| 2002/0078030 A1 | 6/2002 | Iwayama et al. | 707/1 |
| 2002/0188683 A1 | 12/2002 | Lytle et al. | 709/206 |
| 2003/0033288 A1 | 2/2003 | Shanahan et al. | 707/3 |
| 2003/0167279 A1 | 9/2003 | Smiga et al. | 707/102 |
| 2006/0047644 A1 | 3/2006 | Bocking et al. | 707/4 |
| 2007/0244907 A1 | 10/2007 | Hedloy | 707/10 |
| 2008/0313159 A1 | 12/2008 | Hedloy | 707/3 |
| 2010/0211600 A2 | 8/2010 | Hedloy | 707/770 |
| 2010/0281354 A1 | 11/2010 | Hedloy | 715/220 |
| 2011/0072029 A1 | 3/2011 | Hedloy | 707/758 |
| 2013/0189960 A2 | 7/2013 | Hedloy | 455/414.1 |
| 2013/0191406 A2 | 7/2013 | Hedloy | 707/758 |

FOREIGN PATENT DOCUMENTS

| | | | | |
|---|---|---|---|---|
| EP | 0 923 040 A2 | 6/1999 | | G06F 17/60 |
| EP | 1 630 642 | 3/2006 | | G06F 1/16 |
| GB | 2196454 | 4/1988 | | G06F 15/40 |
| GB | 2 318 703 | 4/1998 | | H04M 1/00 |
| JP | 08116362 | 5/1996 | | H04M 3/42 |
| JP | 2008-276766 | 11/2008 | | G06F 17/21 |
| WO | WO 97/21183 | 6/1997 | | G06F 151/00 |
| WO | WO 98/16890 | 4/1998 | | G06F 17/30 |
| WO | WO 98/19259 | 5/1998 | | G06F 17/60 |
| WO | WO 98/34391 | 8/1998 | | H04M 7/00 |
| WO | WO 00/14655 | 3/2000 | | G06F 17/30 |

OTHER PUBLICATIONS

U.S. Pat. No. 6,323,853, Preliminary Amendment, U.S. Appl. No. 09/189,626, 20 pages, Apr. 29, 1999.
U.S. Pat. No. 6,323,853, Office Action, U.S. Appl. No. 09/189,626, 9 pages, Apr. 26, 2000.
U.S. Pat. No. 6,323,853, U.S. Appl. No. 09/189,626, Interview Summary, 2 pages, Jun. 14, 2000.
U.S. Pat. No. 6,323,853, Response, U.S. Appl. No. 09/189,626, 5 pages, Jul. 25, 2000.
U.S. Pat. No. 6,323,853, Final Office Action, U.S. Appl. No. 09/189,626, 10 pages, Sep. 18, 2000.
U.S. Pat. No. 6,323,853, Interview Summary, U.S. Appl. No. 09/189,626, 1 page, Oct. 17, 2000.
U.S. Pat. No. 6,323,853, Response, U.S. Appl. No. 09/189,626, 5 pages, Dec. 18, 2000.
U.S. Pat. No. 6,323,853, Notice of Allowance, U.S. Appl. No. 09/189,626, 7 pages, Jan. 4, 2001.
U.S. Pat. No. 6,323,853, Notice of Allowance, U.S. Appl. No. 09/189,626, 2 pages, Oct. 2, 2001.
U.S. Pat. No. 7,496,854, Preliminary Amendment, U.S. Appl. No. 09/923,134, 7 pages, Dec. 17, 2001.
U.S. Pat. No. 7,496,854, Office Action, U.S. Appl. No. 09/923,134, 10 pages, Oct. 15, 2002.
U.S. Pat. No. 7,496,854, Response, 4 pages, U.S. Appl. No. 09/923,134, Apr. 15, 2003.
U.S. Pat. No. 7,496,854, Final Office Action, U.S. Appl. No. 09/923,134, 7 pages, Jun 27, 2003.
U.S. Pat. No. 7,496,854, Response, U.S. Appl. No. 09/923,134, 6 pages, Aug. 21, 2003.
U.S. Pat. No. 7,496,854, Office Action, U.S. Appl. No. 09/923,134, 4 pages, Nov. 19, 2003.
U.S. Pat. No. 7,496,854, Response, U.S. Appl. No. 09/923,134, 5 pages, Feb. 10, 2004.
U.S. Pat. No. 7,496,854, Notice of Allowance, U.S. Appl. No. 09/923,134, 4 pages, May 19, 2004.
U.S. Pat. No. 7,496,854, Response, U.S. Appl. No. 09/923,134, 14 pages, Dec. 30, 2004.
U.S. Pat. No. 7,496,854, Office Action, U.S. Appl. No. 09/923,134, 7 pages, Aug. 29, 2005.
U.S. Pat. No. 7,496,854, Response, U.S. Appl. No. 09/923,134, 17 pages, Nov. 16, 2005.
U.S. Pat. No. 7,496,854, Final Office Action, U.S. Appl. No. 09/923,134, 10 pages, Feb. 6, 2006.
U.S. Pat. No. 7,496,854, Response, U.S. Appl. No. 09/923,134, 22 pages, Aug. 4, 2006.
U.S. Pat. No. 7,496,854, Office Action, U.S. Appl. No. 09/923,134, 8 pages, Oct. 18, 2006.
U.S. Pat. No. 7,496,854, Interview Summary, U.S. Appl. No. 09/923,134, 3 pages, Jan. 23, 2007.
U.S. Pat. No. 7,496,854, Response, U.S. Appl. No. 09/923,134, 32 pages, Apr. 18, 2007.
U.S. Pat. No. 7,496,854, Notice of Allowance, U.S. Appl. No. 09/923,134, 8 pages, Jul. 13, 2007.
U.S. Pat. No. 7,496,854, Interview Summary, U.S. Appl. No. 09/923,134, 4 pages, Oct. 19, 2007.
U.S. Pat. No. 7,496,854, Office Action, U.S. Appl. No. 09/923,134, 9 pages, Nov. 9, 2007.
U.S. Pat. No. 7,496,854, Response, U.S. Appl. No. 09/923,134, 32 pages, Jan. 24, 2008.
U.S. Pat. No. 7,496,854, Notice of Allowance, U.S. Appl. No. 09/923,134, 7 pages, Jul. 2, 2008.
U.S. Pat. No. 7,496,854, Amendment Under Rule 312; U.S. Appl. No. 09/923,134, 27 pages, Jul. 8, 2008.
U.S. Pat. No. 7,496,854, Response to Amendment Under Rule 312, U.S. Appl. No. 09/923,134, 4 pages, Jan. 21, 2009.
U.S. Appl. No. 12/182,048, filed Jul. 29, 2008, 47 pages.
U.S. Appl. No. 12/182,048, Office Action, 34 pages, Oct. 28, 2010.
U.S. Appl. No. 12/182,048, Interview Summary, 4 pages, Dec. 1, 2010.
U.S. Appl. No. 12/182,048, Response, 36 pages, Dec. 8, 2010.
U.S. Appl. No. 12/841,302, filed Jul. 22, 2010, 47 pages.
U.S. Appl. No. 12/841,302, Accelerated Examination Support Document, 150 pages, Jul. 22, 2010.
U.S. Appl. No. 12/841,302, Office Action, 22 pages, Nov. 24, 2010.
U.S. Appl. No. 12/841,302, Response, 18 pages, Dec. 14, 2010.
U.S. Pat. No. 7,272,604, Office Action, U.S. Appl. No. 09/390,303, 9 pages, May 8, 2002.
U.S. Pat. No. 7,272,604, Response, U.S. Appl. No. 09/390,303, 7 pages, Aug. 8, 2002.
U.S. Pat. No. 7,272,604, Office Action, U.S. Appl. No. 09/390,303, 11 pages, Sep. 27, 2002.
U.S. Pat. No. 7,272,604, Proposed Response, U.S. Appl. No. 09/390,303, 4 pages, Oct. 24, 2002.
U.S. Pat. No. 7,272,604, Response, U.S. Appl. No. 09/390,303, 3 pages, Mar. 27, 2003.
U.S. Pat. No. 7,272,604, Final Office Action, U.S. Appl. No. 09/390,303, 9 pages, Apr. 21, 2003.
U.S. Pat. No. 7,272,604, Response, U.S. Appl. No. 09/390,303, 16 pages, Oct. 21, 2003.
U.S. Pat. No. 7,272,604, Notice of Allowance, U.S. Appl. No. 09/390,303, 7 pages, Nov. 17, 2003.
U.S. Pat. No. 7,272,604, Notice of Allowance, U.S. Appl. No. 09/390,303, 6 pages, Apr. 6, 2004.
U.S. Pat. No. 7,272,604, Supplemental Notice of Allowance, U.S. Appl. No. 09/390,303, 2 pages, Mar. 7, 2006.
U.S. Pat. No. 7,272,604, Office Action, U.S. Appl. No. 09/390,303, 10 pages, Jun. 6, 2006.
U.S. Pat. No. 7,272,604, Response, U.S. Appl. No. 09/390,303, 19 pages, Dec. 5, 2006.
U.S. Pat. No. 7,272,604, Notice of Allowance, U.S. Appl. No. 09/390,303, 7 pages, Feb. 7, 2007.
U.S. Appl. No. 11/745,186, filed May 7, 2007, 61 pages.
U.S. Appl. No. 11/745,186, Office Action, 8 pages, Mar. 6, 2008.
U.S. Appl. No. 11/745,186, Response, 18 pages, May 14, 2008.
U.S. Appl. No. 11/745,186, Office Action, 17 pages, Oct. 14, 2008.
U.S. Appl. No. 11/745,186, Response, 28 pages, Feb. 13, 2009.

(56) References Cited

OTHER PUBLICATIONS

U.S. Appl. No. 11/745,186, Final Office Action, 16 pages, Mar. 26, 2009.
U.S. Appl. No. 11/745,186, Interview Summary, 4 pages, May 7, 2009.
U.S. Appl. No. 11/745,186, Response, 22 pages, Jun. 2, 2009.
U.S. Appl. No. 11/745,186, Advisory Action, 3 pages, Jun. 16, 2009.
U.S. Appl. No. 11/745,186, Request for Continued Examination, 3 pages, Jun. 22, 2009.
U.S. Appl. No. 11/745,186, Office Action, 40 pages, Sep. 29, 2009.
U.S. Appl. No. 11/745,186, Interview Summary, 3 pages, Mar. 26, 2010.
U.S. Appl. No. 11/745,186, Response, 29 pages, Mar. 29, 2010.
U.S. Appl. No. 11/745,186, Final Office Action, 10 pages, Jun. 15, 2010.
U.S. Appl. No. 11/745,186, Interview Summary, 3 pages, Aug. 5, 2010.
U.S. Appl. No. 11/745,186, Response, 24 pages, Aug. 10, 2010.
U.S. Appl. No. 11/745,186, Advisory Action, 3 pages, Aug. 16, 2010.
U.S. Appl. No. 11/745,186, Response, 18 pages, Sep. 23, 2010.
U.S. Appl. No. 11/745,186, Interview Summary, 3 pages, Dec. 14, 2010.
James R. Miller, et al., From Documents to Objects, in SIGCHI, vol. 30, No. 2, 11 pages, Apr. 1998.
Anind K. Dey, et al., "CyberDesk: A Framework for Providing Self-Integrating Context-Aware Services," *Knowledge-Based Systems*, vol. 11, No. 1, pp. 3-13, 1998.
Addressmate Automatic Envelope Addressing Program, User'S Manual, 88 pages, © 1991.
Brown, Peter, Unix Guide, 1 page, 1995.
McMahon, Lee E., SED—A Non-interactive Text Editor, Bell Laboratories, 10 pages, Aug. 15, 1978.
SED(1), BSD Reference Manual Page, 6 pages, Dec. 30, 1993.
"AddressMate Incorporates Correction Capability," The New York Law Publishing Company, 1 page, Jan. 1996.
Mar. 1996 Reviews, website available at www.techweb.com/winmag/library/1996/0396/03rvh002.htm, 9 pages.
Magid, Lawrence J., "Addressing the Matter of Labels," Los Angeles Times, 2 pages, Sep. 23, 1996.
Important Tips for LabelWriter Owners Using AddressMate, 3 pages, Jan. 1995.
Addressing the Issues, 4 pages, Jun. 24, 1993.
Robinson, Philip, "The Envelope, Please: It's AddressMate," San Jose Mercury News, Sunday, 1 page, Jul. 19, 1992.
Supkoff, Steve, AddressMate, PCM, 2 pages, Aug. 1992.
Shannon, L.R., "Addressing Envelopes," The New York Times, 1 page, Tuesday, Jul. 14, 1992.
Schwabach, Bob, "Addressing for Success," On Computers Column, 1 page, Mar. 16, 1992.
Infoworld, p. 15, Mar. 16, 1992.
"Colvin's Beta-Testing of AddressMate Sparks Developer's Appreciation," Westview, 1 page, Apr. 6, 1992.
Press Release: AddressMate Software Automatically Addresses and Bar Codes Envelopes to Save Time and Money, 2 pages, Mar. 9, 1992.
Long, George M., Letter to Mr. David Block, 1 page, Nov. 11, 1994.
Damiano, Philip J., Letter to Mr. David Block, 2 pages, Jan. 5, 1994.
Kahn, Ed, "Envelope Addressing Finally Simplified AddressMate Does Addressing and Much More," Microtimes, 3 pages, Nov. 27, 1995.
Bernthal, Kristen, "LabelWriter XL Plus," PC Catalog, 1 page, Aug. 18, 1995.
Plotkin, David, "Address for Success," Bay Area Computer Currents, p. 36-38, Mar. 21, 1995.
Address Fixer for Microsoft Word and Office, Product Box, 10 pages, no date available.
Getting Results with Microsoft Office for Windows 95, Version 7.0, 635 pages, © 1995-1997.
Getting Results with Microsoft Office 97, 701 pages, © 1995-1997.
Microsoft Word, User's Guide, Version 6.0, 449 pages, © 1993-1994.
CTAGS(1) Manual Page, 3 pages, Oct. 11, 1993 (Last Change).
Wilson, Eve, "Guiding Lawyers: Mapping Law into Hypertext," Artificial Intelligence Review 6, pp. 161-189, 1992.
P.J. Brown, et al., A Help System Based on UNIX Help Manual, 7 pages, Feb. 1987.
Charles H. Franke III, et al., Authoring a Hypertext Unix Help Manual, 8 pages, © 1995.
Brown, P.J., Guide User Manual, 1985, sixteenth impression, 55 pages, Apr. 1995.
Wilson, Eve, "Cases for Justus: Preparing a Case Database for a Hypertext Information Retrieval System," Literary and Linguistic Computing, vol. 5, No. 2, 11 pages, 1990.
John Robertson, et al., The Hypermedia Authoring Research Toolkit, ECHT '94 proceedings, pp. 177-185, Sep. 1994.
Wilson, Eve, Integrated Information Retrieval for Law in a Hypertext Environment, Annual ACM Conference on Research and Development in Information Retrieval, INRIA, 23 pages, 1988.
Multimedia Hyperlinks Automatically Created for Reference Documents, Research Disclosure, 2 pages, Jun. 1993.
BlakE, Joy-Lyn, WikiWikiWeb, Computer World, 4 pages, Jan. 29, 2001.
Microsoft's Supplemental Responses to Arendi's Interrogatories, in *Arendi USA et al. v. Microsoft Corporation*, Civil Action 02-CV-343 (ECT) from the United States District Court for the District of Rhode Island, 4 pages, Apr. 7, 2003.
"Apple Introduces Internet Address Detectors," Press Release, 3 pages, 2 pages, Sep. 8, 1997.
Cunningham, Cara, "Apple Kicks Off Macworld with Talk of Revival," new software demos, InfoWorld Electric, 2 pages, Aug. 7, 1996.
Staten, James, "Apple Looks to the Future," MacWeek, 2 pages, Aug. 7, 1996.
Simmons, Mark, "Striking a Key Note," Mac Addict Online, 5 pages, Aug. 8, 1996.
Miller, Jim, Email regarding Apple Data Detectors, 1 page, Jan. 8, 1997.
Apple Data Detectors—Now Shipping web page, 5 page, Jan. 6, 1997.
The Apple Data Detectors FAQ, 8 pages, Jan. 6, 1997.
Apple Data Detector Webpages, available on web.archive.org/web/20020601164217/www.apple.com/applescript/data_detectors, 15 pages, © 2002.
Apple Data Detectors 1.0.2 Read Me, 3 pages, no date available.
Developer's Guide to Apple Data Detectors, 34 pages, Dec. 1, 1997.
AppleScript Editors, Utilities & Environments, available at www.applescriptsourcebook.com/links/applescripteditors.html, 4 pages, dated Jan. 11, 2004.
eMailman Internet Address Detectors, 3 pages, © 1996-2000.
Tannehill, Steve, News from Jul. 1997, 6 pages, Jul. 31, 1997.
Control-Click! The Archive, 2 pages, © 1997-2000.
ADD Depot, available from Web.archive.org/web/20000819091818/http://homepage.mac.com/Mathewmiller/add, 4 pages, Jan. 12, 2004.
Press Release: Apple Introduces Internet Address Detectors, 4 pages, Sep. 8, 1997.
Langberg, Mike, "Show of Potential Apple Breaks New Ground by Displaying What's on Its Drawing Board 'Innovation is at the Heart of What We Do'", San Jose Mercury News, 2 pages, Aug. 7, 1996.
Apple Introduces Internet Address Detectors, Newsbytes, 11 pages, Sep. 29, 1997.
"Taking [control] of your Mac with System 8," The MacAuthority, 6 pages, Jan. 1998.
Apple Data Detectors 1.0.2, TidBITS Updates, 1 page, Mar. 8, 1998.
Apple Data Detectors 1.0.2, TidBITS #419, 1 page, Mar. 9, 1998.
Engst, Tanya, More on Context on Contextual Menus, tidbits #399, 2 pages, Sep. 29, 1997.
Engst, Tanya, Of Mice and Menus, TidBITS #399, 3 pages, Sep. 22, 1997.
Whaley, Charles, "Will This be Enough to Kick-Start Apple?," Computing Canada, 4 pages, Aug. 4, 1997.
MacOS8.com—Mac OS 8 Indepth, 3 pages, no date available.
"A Farewell to the Apple Advanced Technology Group," SIGCHI, vol. 30, No. 2, 3 pages, Apr. 1998.

(56) References Cited

OTHER PUBLICATIONS

Thomas Bonura et al., Drop Zones, in SIGCHI, vol. 30, No. 2, 8 pages, Apr. 1998.
United States Court of Appeals for the Federal Circuit, Appeal from the United States District Court for the District of Rhode Island in Case No. 02-CV-343, Judge Ernest C. Torres, Brief for the Defendant-Cross Appellant Frank E. Scherkenbach, 59 pages, Jul. 7, 2005.
United States District Court for the District of Rhode Island, 02-CV-343 (ECT), Defendant Microsoft Corporation's Motion for Judgment as a Matter of Law that the '853 Patent is Invalid, 16 pages, Oct. 15, 2004.
United States District Court for the District of Rhode Island, Civ. A. No. 02-CV-343 (ECT), Plaintiff's Reply Memorandum in Support of their Motion for New Trial, Francis A. Connor, 9 pages, Nov. 4, 2004.
United States Court of Appeals for the Federal Circuit, Arendi Reply Brief, 37 pages, Sep. 2, 2005.
United States District Court for the District of Rhode Island, 02-CV-343 (ECT), Memorandum in Support of Defendant Microsoft Corporation's Opposition to Arendi's Motion for a New Trial, Patricia A. Sullivan,15 pages, Oct. 27, 2004.
United States Court of Appeals for the Federal Circuit, Appeal from the United States District Court for the District of Rhode Island, 02-CV-343 (ECT), Brief of Plaintiffs—Appellants Arendi U.S.A., Inc. and Arend Holding Limited, Donald R. Dunner, 61 pages, Apr. 25, 2005.
United States Court of Appeals for the Federal Circuit, Appeal from the United States District Court for the District of Rhode Island, 02-CV-343 (ECT), Reply Brief for Defendant—Cross Appellant, Frank E. Scherkenbach, 27 pages, Oct. 3, 2005.
United States District Court for the District of Rhode Island, Order Denying Defendant Microsoft Corporation's Motion for Judgment as a Matter of Law That the '853 Patent is Invalid, C.A. No. 02-343T, Ernest C. Torres, Chief Judge, 6 pages, Nov. 30, 2004.
United States District Court for the District of Rhode Island, C.A. No. 02-343T, Order Denying Plaintiffs' Motion for New Trial, Ernest C. Tones, Chief Judge, 18 pages, Nov. 30, 2004.
*Arendi USA, Inc. et al.* vs. *Microsoft Corporation, et al.* C.A. No. 02-343T Court Transcript from 2:00 PM, 48 pages, Sep. 13, 2004, Providence, RI.
*Arendi USA, Inc. et al.* vs. *Microsoft Corporation, et al.* C.A. No. 02-343T Court Transcript from Sep. 14, 2004, 165 pages, Providence, RI.
*Arendi USA, Inc. et al.* vs. *Microsoft Corporation, et al.* C.A. No. 02-343T Court Transcript from Sep. 15, 2004, 111 pages, Providence, RI.
*Arendi USA, Inc. et al.* vs. *Microsoft Corporation, et al.* C.A. No. 02-343T Court Transcript from Sep. 16, 2004, 142 pages, Providence, RI.
*Arendi USA, Inc. et al.* vs. *Microsoft Corporation, et al.* C.A. No. 02-343T Court Transcript from Sep. 17, 2004, 66 pages, Providence, RI.
*Arendi USA, Inc. et al.* vs. *Microsoft Corporation, et al.* C.A. No. 02-343T Court Transcript from Sep. 20, 2004, Providence, RI, 225 pages.
*Arendi USA, Inc. et al.* vs. *Microsoft Corporation, et al.* C.A. No. 02-343T Court Transcript from Sep. 21, 2004, Providence, RI, 170 pages.
*Arendi USA, Inc. et al.* vs. *Microsoft Corporation, et al.* C.A. No. 02-343T Court Transcript from Sep. 22, 2004, Providence, RI, 156 pages.
*Arendi USA, Inc. et al.* vs. *Microsoft Corporation, et al.* C.A. No. 02-343T Court Transcript from Sep. 23, 2004, Providence, RI, 140 pages.
*Arendi USA, Inc. et al.* vs. *Microsoft Corporation, et al.* C.A. No. 02-343T Court Transcript from Sep. 27, 2004, Providence, RI, 17 pages.
*Arendi USA, Inc. et al.* vs. *Microsoft Corporation, et al.* C.A. No. 02-343T Court Transcript from Sep. 28, 2004, Providence, RI, 106 pages.

Novell GroupWise User's Guide for Windows 16-BIT, Version 5.2, Novell, Inc., Orem, Utah, MS 125993, 235 pages, 1993.
Novell GroupWise Webaccess User's Guide, Novell, Inc., Orem, Utah, MS 126785, 37 pages, 1998.
Novell GroupWise User's Guide for Windows 32-BIT, Novell, Inc., Orem, Utah, MS 126463, 322 pages, 1998.
Andrew Wood, et al., "CyberDesk: Automated Integration of Desktop and Network Services", GVU Technical Support, OIT-GVU-97-11, 5 pages, May 1997.
Gregory D. Abowd, et al., "Applying Dynamic Integration as a Software Infrastructure for Context-Aware Computing," GVU Techincal Report, GIT-GVU-97-18, 21 pages, Sep. 1997.
Gregory D. Abowd, et al., "Context-awareness in Wearable and Ubiquitous Computing," GVU Techincal Report, GIT-GVU-97-11, 13 pages, Mar. 1997.
Apple Data Detectors User's Manual, 16 pages, © 1997.
Apple Internet Address Detectors User's Manual, 16 pages, © 1997.
Apple Introduces Internet Address Detectors, 4 pages, Sep. 8, 1997.
Contextual Menu Manager/Apple Data Detectors, 5 pages, date unavailable.
CoStar User Manual for AddressMate and AddressMate Plus, 219 pages, © 1994-1995.
Anind K. Dey, et al., CyberDesk: The Use of Perception in Context-Aware Computing, PUI Workshop Submission, Proc. of 1997 Workshop on Perceptual User Interfaces (PUI '97), 4 pages, Oct. 1997.
Dey, Anind K., "Context-Aware Computing: The CyberDesk Project," Future Computing Environments, AAAI '98 Spring Symposium, Stanford University, pp. 51-55, Mar. 23-25, 1998.
Anind K. Dey, et al., "CyberDesk: A Framework for Providing Self-Integrating Ubiquitous Software Services," GVU Technical Report, GIT-GVU-97-10, 18 pages, 1997.
L. Nancy Garrett, et al., "Intermedia: Issues, Strategies, and Tactics in the Design of a Hyermedia Document System," pp. 163-174, © 1986.
Wilson, Eve, "Links and Structures in Hypertext Databases for Law," Proceedings of the First European Conference on Hypertext, INRIA, 20 pages, Nov. 1990.
Langberg, Mike, "Innovation is at the Heart of What We Do, Apple Breaks New Ground by Displaying What's on It's Drawing Board," Mercury News, pp. 1-2, Aug. 7, 1996.
Henry Lieberman, et al., Training Agents to Recognize Text by Example, Proc. of the Third Annual Conference on Autonomous Agents, Seattle, WA, 13 pages, 1999.
Bonnie A. Nardi, et al., Collaborative, Programmable Intelligent Agents, Website, pp. 1-11, Mar. 1998.
Milind S. Pandit, et al., "The Selection Recognition Agent: Instance Access to Relevant Information and Operations," Proc. of Intelligent User Interfaces 1997, Orlando, FL, 6 pages, 1997.
Spell, iSpell, Spellout, 71 pages, © 1994.
Microsoft Word 97 Help File entitled "Automatically Check Spelling and Grammar as You Type," 1 page, 2003.
Excerpt from Jury Charge Transcript for C.A. No. 02-343T, *Arendi USA, Inc. et al.* vs. *Microsoft Corporation et al.*, 45 pages, Sep. 28, 2004.
Microsoft Corporation and Dell Inc.'s Answer, Affirmative Defenses and Counterclaims to Complaint, *Arendi Holding Ltd.* v. *Microsoft Corp. et al.*, C.A. No. 09-119-JJF, from the United States District Court for the District of Delaware, pp. 1-17, Apr. 30, 2009.
"More about the Database," http://c2.com/cgi/wiki?MoreAbout-TheDatabase, pp. 1-3, last edited May 7, 2009.
"Ward Cunningham," http://c2.com/cgi/wiki?WardCunningham, pp. 1-15, last edited Apr. 23, 2009.
"Adding New Pages," http://c2.com/cgi/wiki?AddingNewPages, pp. 1-2, last edited Jun. 8, 2009.
"Wiki Wiki Web," http://c2.com/cgi/wiki?WikiWikiWeb, 1 page, last edited Jun. 1, 2009.
Quinlan, Tom, "Apple System Software Branches Out," 1 page, Mar. 16, 1992.
"Introducing AddressMate Plus, The Address Book Manager for Microsoft Word," 4 pages, May 1996.
"Getting Results with Microsoft Office for Windows 95," Microsoft, 636 pages, 1995.
"AddressMate for Windows, Adds all the missing pieces to your word processor," 6 pages, no date available.

(56) References Cited

OTHER PUBLICATIONS

Opposition against European Patent EP 1 171 836, Letter to the European Patent Office in Preparation for the Oral Proceedings scheduled for May 26, 2009, 31 pages, Mar. 26, 2009.
Opposition against European Patent EP 1 171 836, Auxiliary Request 1 Claims, 3 pages, Mar. 26, 2009.
Opposition against European Patent EP 1 171 836, Auxiliary Request 2 Claims, 3 pages, Mar. 26, 2009.
Opposition against European Patent EP 1 171 836, Auxiliary Request 3 Claims, 3 pages, Mar. 26, 2009.
Opposition against European Patent EP I 171 836, Auxiliary Request 4 Claims, 3 pages, Mar. 26, 2009.
Opposition against European Patent EP 1 171 836, Auxiliary Request 5 Claims, 3 pages, Mar. 26, 2009.
Opposition against European Patent EP 1 171 836, Auxiliary Request 6 Claims, 3 pages, Mar. 26, 2009.
Opposition against European Patent EP 1 171 836, Auxiliary Request 7 Claims, 3 pages, Mar. 26, 2009.
Opposition against European Patent EP 1 171 836, Auxiliary Request 8 Claims, 3 pages, Mar. 26, 2009.
Opposition against European Patent EP 1 171 836, Auxiliary Request 9 Claims, 3 pages, Mar. 26, 2009.
Opposition against European Patent EP 1 171 836, Auxiliary Request 10 Claims, 3 pages, Mar. 26, 2009.
Opposition against European Patent EP 1 171 836, Auxiliary Request 11 Claims, 3 pages, Mar. 26, 2009.
Opposition against European Patent EP 1 171 836, Auxiliary Request 12 Claims, 3 pages, Mar. 26, 2009.
Opposition against European Patent EP 1 171 836, Auxiliary Request 13 Claims, 3 pages, Mar. 26, 2009.
Opposition against European Patent EP 1 171 836, Auxiliary Request 14 Claims, 3 pages, Mar. 26, 2009.
Opposition against European Patent EP 1 171 836, Auxiliary Request 15 Claims, 3 pages, Mar. 26, 2009.
Opposition against European Patent EP 1 171 836, Auxiliary Request 16 Claims, 3 pages, Mar. 26, 2009.
Expert Report of Professor Benjamin Goldberg, 43 pages, dated Mar. 10, 2008.
Supplemental Expert Report of Professor Benjamin Goldberg, 15 pages, May 6, 2008.
Second Supplemental Expert Report of Professor Benjamin Goldberg, 32 pages, Mar. 26, 2009.
Expert Report of Professor Calvin Gidney III, 3 pages, Mar. 26, 2009.
European Patent Office, Summons to Attend Oral Proceedings pursuant to Rule 115(1) EPC, 18 pages, Jan. 23, 2009.
Affidavit of James Miller, 12 pages, Jul. 19, 2006.
Affidavit of David Block, 23 pages, Jul. 21, 2006.
Order Re Claim Construction, in *Arendi U.S.A. Inc. et al.* v. *Microsoft Corp.*, CA No. 02-343-T, from United States District Court for the District of Rhode Island, 4 pages, Sep. 27, 2004.
Expert Report of W. Bruce Croft, Ph.D., in *Arendi U.S.A., Inc. et al.* v. *Microsoft Corp.*, CA No. 02-CV-343 (ECT), from United States District Court for the District of Rhode Island, 66 pages, Mar. 1, 2004.
Supplemental Expert Report of W. Bruce Croft, Ph.D., in *Arendi U.S.A., Inc. et al.* v. *Microsoft Corp.*, CA No. 02-CV-343 (ECT), from United States District Court for the District of Rhode Island, 42 pages, Jun. 9, 2004.
Affirming Claim Construction Order, in *Arendi USA et al.* v. *Microsoft Corp.*, No. 05-1170, 05-1171, from Court of Appeals for the Federal Circuit, 1 page, Feb. 8, 2006.
Church, Kenneth et al., "Commercial Applications of Natural Language Processing," 30 pages, Mar. 13, 2003.
Yankelovich, Nichole et al., "Intermedia: The concept and the Construction of a Seamless Information Environment," *Electronic Publishing Technologies*, pp. 81-96, Jan. 1988.
Utting, Kenneth et al., "Context and Orientation in Hypermedia Networks," *AMC Transactions on Information Systems*, vol. 7, No. 1, pp. 58-84, Jan. 1989.

Kahn, Paul, "Linking Together Books: Experiments in Adapting Published Material into Intermedia Documents," *Hypermedia*, vol. 1 No. 2, pp. 1-37, 1989.
Combs, James, "Hypertext, Full-Text and Automatic Linking," pp. 83-98, 1990.
Catlin, Karen Smith et al., "Hypermedia Templates: An Authors Tools," *Hypertext 1991 Proceedings*, pp. 147-160, Dec. 1991.
Halasz, Frank, "Reflections on Notecards: Seven Issues for the Next Generation of Hypermedia Systems," *Hypertext 87 Papers*, pp. 345-365, Nov. 1987.
Haan, Bernard et al., "IRIS Hypermedia Services," pp. 36-51, Jan. 1992.
McKnight, Dillon, "Review, The Textbook of the Future," *Hypertext: a Psychological Perspective*, pp. 19-51, 8 pages, Mar. 1993.
Bouvin, Niels Olof, "Augmenting the Web Through Open Hypermedia," 95 pages, Nov. 2000.
Halasz, Frank et al., "The Dexter Hypertext Reference Model," pp. 95-133, Dec. 7, 1989.
Fountain, Andrew et al., "Microcosm: An Open Model for Hypermedia with Dynamic Linking," *Hypertext: Concept Systems and Applications, Proceedings of the First European Conference on Hypertext*, France, 16 pages, Nov. 1990.
Justus: Wilson, Eve, "Cases for Justus: Preparing a Case Database for a Hypertext Information Retrieval System," *Library and Linguistics Computing*, vol. 5, No. 2, pp. 119-128, 1990.
"Claris Em@iler Getting Started," Claris Corporation, pp. MS112968-MS113028, © 1995-1997.
"OmniPage Pro for Windows 95," Version 7.0 Caere Corporation, pp. MS110194-MS110250, © 1996.
Moi Khor, Siew, Microsoft Office Excel 2003 Preview, 17 pages, Jun. 2003.
Microsoft Corporation and Dell Inc.'s Invalidity Contentions, in *Arendi Holding Ltd.* v. *Microsoft Corp*, CA No. 09-119-JJF, from United States District Court for the District of Delaware, pp. 1-26, Aug. 14, 2009.
Exhibit A, in *Arendi Holding Ltd.* v. *Microsoft Corp*, CA No. 09-119-JJF, from United States District Court for the District of Delaware, pp. 1-35, Aug. 14, 2009.
Exhibit AA, in *Arendi Holding Ltd.* v. *Microsoft Corp*, CA No. 09-119-JJF, from United States District Court for the District of Delaware, pp. 1-28, Aug. 14, 2009.
Exhibit AAA, in *Arendi Holding Ltd.* v. *Microsoft Corp*, CA No. 09-119-JJF, from United States District Court for the District of Delaware, pp. 1-33, Aug. 14, 2009.
Exhibit B, in *Arendi Holding Ltd.* v. *Microsoft Corp*, CA No. 09-119-JJF, from United States District Court for the District of Delaware, pp. 1-33, Aug. 14, 2009.
Exhibit BB, in *Arendi Holding Ltd.* v. *Microsoft Corp*, CA No. 09-119-JJF, from United States District Court for the District of Delaware, pp. 1-36, Aug. 14, 2009.
Exhibit C, in *Arendi Holding Ltd.* v. *Microsoft Corp*, CA No. 09-119-JJF, from United States District Court for the District of Delaware, pp. 1-34, Aug. 14, 2009.
Exhibit CC, in *Arendi Holding Ltd.* v. *Microsoft Corp*, CA No. 09-119-JJF, from United States District Court for the District of Delaware, pp. 1-32, Aug. 14, 2009.
Exhibit D, in *Arendi Holding Ltd.* v. *Microsoft Corp*, CA No. 09-119-JJF, from United States District Court for the District of Delaware, pp. 1-32, Aug. 14, 2009.
Exhibit DD, in *Arendi Holding Ltd.* v. *Microsoft Corp*, CA No. 09-119-JJF, from United States District Court for the District of Delaware, pp. 1-22, Aug. 14, 2009.
Exhibit E, in *Arendi Holding Ltd.* v. *Microsoft Corp*, CA No. 09-119-JJF, from United States District Court for the District of Delaware, pp. 1-33, Aug. 14, 2009.
Exhibit EE, in *Arendi Holding Ltd.* v. *Microsoft Corp*, CA No. 09-119-JJF, from United States District Court for the District of Delaware, pp. 1-23, Aug. 14, 2009.
Exhibit F, in *Arendi Holding Ltd.* v. *Microsoft Corp*, CA No. 09-119-JJF, from United States District Court for the District of Delaware, pp. 1-33, Aug. 14, 2009.

(56) References Cited

OTHER PUBLICATIONS

Exhibit FF, in *Arendi Holding Ltd. v. Microsoft Corp*, CA No. 09-119-JJF, from United States District Court for the District of Delaware, pp. 1-40, Aug. 14, 2009.
Exhibit G, in *Arendi Holding Ltd. v. Microsoft Corp*, CA No. 09-119-JJF, from United States District Court for the District of Delaware, pp. 1-33, Aug. 14, 2009.
Exhibit GG, in *Arendi Holding Ltd. v. Microsoft Corp*, CA No. 09-119-JJF, from United States District Court for the District of Delaware, pp. 1-32, Aug. 14, 2009.
Exhibit H, in *Arendi Holding Ltd. v. Microsoft Corp*, CA No. 09-119-JJF, from United States District Court for the District of Delaware, pp. 1-33, Aug. 14, 2009.
Exhibit HH, in *Arendi Holding Ltd. v. Microsoft Corp*, CA No. 09-119-JJF, from United States District Court for the District of Delaware, pp. 1-32, Aug. 14, 2009.
Exhibit I-1 through I-6, in *Arendi Holding Ltd. v. Microsoft Corp*, CA No. 09-119-JJF, from United States District Court for the District of Delaware, pp. 1-1800, Aug. 14, 2009.
Exhibit II, in *Arendi Holding Ltd. v. Microsoft Corp*, CA No. 09-119-JJF, from United States District Court for the District of Delaware, pp. 1-34, Aug. 14, 2009.
Exhibit J, in *Arendi Holding Ltd. v. Microsoft Corp*, CA No. 09-119-JJF, from United States District Court for the District of Delaware, pp. 1-89, Aug. 14, 2009.
Exhibit JJ, in *Arendi Holding Ltd. v. Microsoft Corp*, CA No. 09-119-JJF, from United States District Court for the District of Delaware, pp. 1-35, Aug. 14, 2009.
Exhibit K, in *Arendi Holding Ltd. v. Microsoft Corp*, CA No. 09-119-JJF, from United States District Court for the District of Delaware, pp. 1-260, Aug. 14, 2009.
Exhibit KK, in *Arendi Holding Ltd. v. Microsoft Corp*, CA No. 09-119-JJF, from United States District Court for the District of Delaware, pp. 1-34, Aug. 14, 2009.
Exhibit L, in *Arendi Holding Ltd. v. Microsoft Corp*, CA No. 09-119-JJF, from United States District Court for the District of Delaware, pp. 1-190, Aug. 14, 2009.
Exhibit LL, in *Arendi Holding Ltd. v. Microsoft Corp*, CA No. 09-119-JJF, from United States District Court for the District of Delaware, pp. 1-33, Aug. 14, 2009.
Exhibit M, in *Arendi Holding Ltd. v. Microsoft Corp*, CA No. 09-119-JJF, from United States District Court for the District of Delaware, pp. 1-58, Aug. 14, 2009.
Exhibit MM, in *Arendi Holding Ltd. v. Microsoft Corp*, CA No. 09-119-JJF, from United States District Court for the District of Delaware, pp. 1-29, Aug. 14, 2009.
Exhibit N, in *Arendi Holding Ltd. v. Microsoft Corp*, CA No. 09-119-JJF, from United States District Court for the District of Delaware, pp. 1-47, Aug. 14, 2009.
Exhibit NN, in *Arendi Holding Ltd. v. Microsoft Corp*, CA No. 09-119-JJF, from United States District Court for the District of Delaware, pp. 1-30, Aug. 14, 2009.
Exhibit O, in *Arendi Holding Ltd. v. Microsoft Corp*, CA No. 09-119-JJF, from United States District Court for the District of Delaware, pp. 1-51, Aug. 14, 2009.
Exhibit OO, in *Arendi Holding Ltd. v. Microsoft Corp*, CA No. 09-119-JJF, from United States District Court for the District of Delaware, pp. 1-29, Aug. 14, 2009.
Exhibit P, in *Arendi Holding Ltd. v. Microsoft Corp*, CA No. 09-119-JJF, from United States District Court for the District of Delaware, pp. 1-133, Aug. 14, 2009.
Exhibit PP, in *Arendi Holding Ltd. v. Microsoft Corp*, CA No. 09-119-JJF, from United States District Court for the District of Delaware, pp. 1-22, Aug. 14, 2009.
Exhibit Q, in *Arendi Holding Ltd. v. Microsoft Corp*, CA No. 09-119-JJF, from United States District Court for the District of Delaware, pp. 1-40, Aug. 14, 2009.
Exhibit QQ, in *Arendi Holding Ltd. v. Microsoft Corp*, CA No. 09-119-JJF, from United States District Court for the District of Delaware, pp. 1-52, Aug. 14, 2009.
Exhibit R, in *Arendi Holding Ltd. v. Microsoft Corp*, CA No. 09-119-JJF, from United States District Court for the District of Delaware, pp. 1-44, Aug. 14, 2009.
Exhibit RR, in *Arendi Holding Ltd. v. Microsoft Corp*, CA No. 09-119-JJF, from United States District Court for the District of Delaware, pp. 1-32, Aug. 14, 2009.
Exhibit S, in *Arendi Holding Ltd. v. Microsoft Corp*, CA No. 09-119-JJF, from United States District Court for the District of Delaware, pp. 1-51, Aug. 14, 2009.
Exhibit SS, in *Arendi Holding Ltd. v. Microsoft Corp*, CA No. 09-119-JJF, from United States District Court for the District of Delaware, pp. 1-34, Aug. 14, 2009.
Exhibit T, in *Arendi Holding Ltd. v. Microsoft Corp*, CA No. 09-119-JJF, from United States District Court for the District of Delaware, pp. 1-34, Aug. 14, 2009.
Exhibit TT, in *Arendi Holding Ltd. v. Microsoft Corp*, CA No. 09-119-JJF, from United States District Court for the District of Delaware, pp. 1-32, Aug. 14, 2009.
Exhibit U, in *Arendi Holding Ltd. v. Microsoft Corp*, CA No. 09-119-JJF, from United States District Court for the District of Delaware, pp. 1-34, Aug. 14, 2009.
Exhibit UU, in *Arendi Holding Ltd. v. Microsoft Corp*, CA No. 09-119-JJF, from United States District Court for the District of Delaware, pp. 1-32, Aug. 14, 2009.
Exhibit V, in *Arendi Holding Ltd. v. Microsoft Corp*, CA No. 09-119-JJF, from United States District Court for the District of Delaware, pp. 1-34, Aug. 14, 2009.
Exhibit VV, in *Arendi Holding Ltd. v. Microsoft Corp*, CA No. 09-119-JJF, from United States District CoUrt for the District of Delaware, pp. 1-33, Aug. 14, 2009.
Exhibit W, in *Arendi Holding Ltd. v. Microsoft Corp*, CA No. 09-119-JJF, from United States District Court for the District of Delaware, pp. 1-35, Aug. 14, 2009.
Exhibit WW, in *Arendi Holding Ltd. v. Microsoft Corp*, CA No. 09-119-JJF, from United States District Court for the District of Delaware, pp. 1-32, Aug. 14, 2009.
Exhibit X, in *Arendi Holding Ltd. v. Microsoft Corp*, CA No. 09-119-JJF, from United States District Court for the District of Delaware, pp. 1-7, Aug. 14, 2009.
Exhibit XX, in *Arendi Holding Ltd. v. Microsoft Corp*, CA No. 09-119-JJF, from United States District Court for the District of Delaware, pp. 1-31, Aug. 14, 2009.
Exhibit Y, in *Arendi Holding Ltd. v. Microsoft Corp*, CA No. 09-119-JJF, from United States District Court for the District of Delaware, pp. 1-34, Aug. 14, 2009.
Exhibit YY, in *Arendi Holding Ltd. v. Microsoft Corp*, CA No. 09-119-JJF, from United States District Court for the District of Delaware, pp. 1-31, Aug. 14, 2009.
Exhibit Z, in *Arendi Holding Ltd. v. Microsoft Corp*, CA No. 09-119-JJF, from United States District Court for the District of Delaware, pp. 1-34, Aug. 14, 2009.
Exhibit ZZ, in *Arendi Holding Ltd. v. Microsoft Corp*, CA No. 09-119-JJF, from United States District Court for the District of Delaware, pp. 1-32, Aug. 14, 2009.
Defendants Microsoft Corp. and Dell, Inc.'s Brief in Support of their Motion for Summary Judgment of Invalidity for Failure to Comply with 35 U.S.C. § 112, in *Arendi Holding Ltd. v. Microsoft Corp*, CA No. 09-119-JJF, from United States District Court for the District of Delaware, pp. 1-23, Aug. 10, 2009.
Declaration of W. Bruce Croft, PH.D., in *Arendi Holding Ltd. v. Microsoft Corp*, CA No. 09-119-JJF, from United States District Court for the District of Delaware, pp. 1-15, Aug. 10, 2009.
Plaintiff's Opening Brief in Support of Its Proposed Claim Construction, in *Arendi Holding Ltd. v. Microsoft Corp*, CA No. 09-119-JJF, from United States District Court for the District of Delaware, pp. 1-36, Aug. 10, 2009.
Microsoft Corp. and Dell Inc.'s Claim Construction Brief, in *Arendi Holding Ltd. v. Microsoft Corp*, CA No. 09-119-JJF, from United States District Court for the District of Delaware, pp. 1-28, Aug. 10, 2009.
Plaintiff's Counter-Statement of Disputed Material Facts in Opposition to Defendants' Motion for Summary Judgment of Invalidity, in

(56) References Cited

OTHER PUBLICATIONS

*Arendi Holding Ltd.* v. *Microsoft Corp*, CA No. 09-119-JJF, from United States District Court for the District of Delaware, pp. 1-19, Aug. 24, 2009.

Plaintiff's Answering Brief in Support of its Proposed Claim Constructions, in *Arendi Holding Ltd.* v. *Microsoft Corp*, CA No. 09-119-JJF, from United States District Court for the District of Delaware, pp. 1-43, Aug. 25, 2009.

Microsoft Corp. and Dell, Inc.'s Answering Claim Construction Brief, in *Arendi Holding Ltd.* v. *Microsoft Corp*, CA No. 09-119-JJF, from United States District Court for the District of Delaware, pp. 1-25, Aug. 25, 2009.

Microsoft Corp. and Dell, Inc.'s Response to Plaintiff's Counter-Statement to Defendants' Motion for Summary Judgment of Invalidity, in *Arendi Holding Ltd.* v. *Microsoft Corp*, CA No. 09-119-JJF, from United States District Court for the District of Delaware, pp. 1-22, Aug. 31, 2009.

Microsoft Corp. and Dell, Inc.'s First Amended Answer, Affirmative Defenses and Counterclaims to Complaint, in *Arendi Holding Ltd.* v. *Microsoft Corp*, CA No. 09-119-JJF, from United States District Court for the District of Delaware, pp. 1-34, Oct. 19, 2009.

Plaintiff's Answer to Defendants' First Amended Counterclaims, in *Arendi Holding Ltd.* v. *Microsoft Corp*, CA No. 09-119-JJF, from United States District Court for the District of Delaware, pp. 1-19, Oct. 30, 2009.

Microsoft Corp. and Dell, Inc.'s Second Amended Answer, Affirmative Defenses and Counterclaims to Complaint, in *Arendi Holding Ltd.* v. *Microsoft Corp*, CA No. 09-119-JJF, from United States District Court for the District of Delaware, pp. 1-34, Dec. 8, 2009.

Opposition for European Patent No. EP-B-1171836, in the European Patent Office, pp. 1-32, Jul. 26, 2006.

In Response to Notice of Opposition for European Patent No. EP-B-1171836, in the European Patent Office, pp. 1-21, Mar. 7, 2007.

Decision Revoking European Patent No. EP-B-1171836, European Patent Office, pp. 1-13, Jul. 9, 2009.

Notice of Appeal for European Patent No. EP-B-1171836, in the European Patent Office, pp. 1-2, Sep. 1, 2009.

Grounds of Appeal for European Patent No. EP-B-1171836, in the European Patent Office, pp. 1-62, Nov. 19, 2009.

Plaintiff's Answer to Microsoft Corporation's and Dell Inc.'s Second Amended Counterclaims, in *Arendi Holding Ltd.* v. *Microsoft Corp. and Dell Inc.*, CA No. 09-119-JJF-LPS, from United States District Court for the District of Delaware, pp. 1-20, Dec. 14, 2009.

Submission of opponent (Microsoft) in opposition against European Patent No. 1 171 836, Appeal T1779/09-3501, in the European Patent Office, 5 pages, Mar. 25, 2010.

Second Affidavit of David Block, 15 pages, May 15, 2009.

Second Affidavit of James Miller, 36 pages, May 15, 2009.

Hall, Wendy, et al., "Rethinking Hypermedia," Kluwer Academic Publishers, 87 pages, 1996.

Deposition of David Block, *Arendi U.S.A., Inc.* v. *Microsoft Corp.*, Case No. 02-CV-343 (ECT), from United States District Court for the Northern District of California, 196 pages, Aug. 13, 2004.

Exhibits for the Deposition of David Block, *Arendi U.S.A., Inc.* v. *Microsoft Corp.*, Case No. 02-CV-343 (ECT), from United States District Court for the Northern District of California, 334 pages, Aug. 13, 2004.

Writ of Summons to Arendi Holding Co., District Court in the Hague and English translation, 65 pages, Oct. 26, 2005.

Microsoft's Reply in Counterclaim for Infringement, District Court in the Hague, No. 2006/0782, 26 pages, Sep. 24, 2008.

Microsoft's Reply in Counterclaim for Infringement, District Court in the Hague, No. 2006/0782, English Translation, 23 pages, Sep. 24, 2008.

Statement of Defense in the Principal Action and With Regard to the Interlocutory Claim Also Comprising a Counterclaim, With Exhibit, District Court in the Hague, No. 2006/0782, 58 pages, Jan. 31, 2007.

Statement of Defense in the Principal Action and With Regard to the Interlocutory Claim Also Comprising a Counterclaim, District Court in the Hague, No. 2006/0782, English Translation, 23 pages, Jan. 31, 2007.

Statement of Rejoinder in the Principal Action (Incl. With Regard to the Interlocutory Claims) Also Comprising Statement of Reply in the Counterclaim With Exhibits, District Court in the Hague, No. 2006/0782, 126 pages, Mar. 12, 2008.

Statement of Rejoinder in the Principal Action (Incl. With Regard to the Interlocutory Claims) Also Comprising Statement of Reply in the Counterclaim, District Court in the Hague, No. 2006/0782, English Translation, 33 pages, Mar. 12, 2008.

Letter from Abraham H. Spierer to David Block, Dec. 19, 1994.

Claris Em@iler User's Manual, 187 pages, © 1995-1997.

"Word Lookup Data Detectors," Dictionary.com, available at http://dictionary.reference.com/mac/add.html, 3 pages, © 2004.

Apple.com internet web pages (marked "MS 118139-MS 118143"), 5 pages, © 2001.

"Overview: What are Apple Data Detectors", Apple.com internet web pages (marked "MA 118078-MS 118092"), 15 pages, © 2002.

Addressmate Plus User Manual Addendum, 2 pages, Nov. 1, 1995.

Now Software, Inc., "Now Contact & Up•to•Date Quick Reference Guide", 18 pages, © 1992-95.

Now Software, Inc., "Now Contact version 3.5 User's Guide", 204 pages, © 1992-95.

Now Software, Inc., "Now Up•to•Date version 3.5 User's Guide", 210 pages, © 1992-95.

Now Software, Inc., "Now Utilities Quick Reference Guide", 6 pages, no date available.

Now Software, Inc., "What's New in Now Up•to•Date & Now Contact", 14 pages, © 1995.

Reply Brief of Plaintiffs—Appellants Arendi USA, Inc. and Arendi Holding Limited, United States Court of Appeals for the Federal Circuit, 37 pages, Sep. 2, 2005.

Apple Data Detectors/Internet Address Detectors, ADD-IAD_1.0.2_Info.txt, 1 page, Mar. 5, 1998.

Cortinas, M., Data Ratchet extracts info, ZD.com, 2 pages, Apr. 3, 1997.

Glucose Unveils Data Ratchet v.1.1!, Glucose Development Corp., 5 pages, 1997.

Glucose Releases Data Ratchet Source, Glucose Press Release, 1 page, Dec. 18, 1999.

Are you a document mechanic?, from Glucose Development Corp.'s webpage (http://glulabs.com), 2 pages, 2002.

Glucose Open Source Tools, from Glucose Development Corp., 2 pages, 1999.

E-Mail 'Net Differences—Eudora Pro and E-Mail Connection shine in their own ways . . . , Communications Week, 4 pages, Jan. 6, 1997.

Internet Update Sep. 10, 1997, Newsbytes news Network, 5 pages, Sep. 10, 1997.

Brouwer, Rene, ADD → Address Book, 1 page, Jun. 8, 1998.

Byrne, Mike, ADD → New Mail, 1 page, Aug. 23, 1998.

MacCentral: Apple Macintosh News, 4 pages, Jan. 12-Jan. 13, 2004.

Turney, P., Learning to Extract Key Phrases from Text, National Research Council of Canada, 46 pages, Feb. 1999.

Deposition of Atle Hedloy in *Arendi Holding Ltd.* v. *Microsoft Corp*, CA No. 09-119-JJF, from United States District Court for the District of Delaware, pp. 162-213, Mar. 7, 2010.

Deposition of David Block in *Arendi Holding Ltd.* v. *Microsoft Corp*, CA No. 09-119-JJF, from United States District Court for the District of Delaware, pp. 1-4, 31-52, 56-57, 67, Apr. 9, 2010.

Exhibit 15, in Deposition of David Block in *Arendi Holding Ltd.* v. *Microsoft Corp*, CA No. 09-119-JJF, from United States District Court for the District of Delaware , pp. 1-6, Apr. 9, 2010.

Exhibit 16, in Deposition of David Block in *Arendi Holding Ltd.* v. *Microsoft Corp*, CA No. 09-119-JJF, from United States District Court for the District of Delaware, pp. 1-2, Apr. 9, 2010.

Exhibit 17, in Deposition of David Block in *Arendi Holding Ltd.* v. *Microsoft Corp*, CA No. 09-119-JJF, from United States District Court for the District of Delaware, pp. 1-28, Apr. 9, 2010.

Exhibit 18, in Deposition of David Block in *Arendi Holding Ltd.* v. *Microsoft Corp*, CA No. 09-119-JJF, from United States District Court for the District of Delaware, pp. 1-23, Apr. 9, 2010.

(56) References Cited

OTHER PUBLICATIONS

Exhibit 19, in Deposition of David Block in *Arendi Holding Ltd.* v. *Microsoft Corp*, CA No. 09-119-JJF, from United States District Court for the District of Delaware, pp. 1-13, Apr. 9, 2010.
Deposition of James R. Miller in *Arendi Holding Ltd.* v. *Microsoft Corp*, CA No. 09-119-JJF, from United States District Court for the District of Delaware, pp. 1-4; 72-115, Apr. 9, 2010.
Exhibit 11, in Deposition of James R. Miller in *Arendi Holding Ltd.* v. *Microsoft Corp*, CA No. 09-119-JJF, from United States District Court for the District of Delaware, pp. 1-7, Apr. 9, 2010.
Exhibit 12, in Deposition of James R. Miller in *Arendi Holding Ltd.* v. *Microsoft Corp*, CA No. 09-119-JJF, from United States District Court for the District of Delaware, pp. 1-2, Apr. 9, 2010.
Exhibit 13, in Deposition of James R. Miller in *Arendi Holding Ltd.* v. *Microsoft Corp*, CA No. 09-119-JJF, from United States District Court for the District of Delaware, pp. 1-28, Apr. 9, 2010.
Exhibit 14, in Deposition of James R. Miller in *Arendi Holding Ltd.* v. *Microsoft Corp*, CA No. 09-119-JJF, from United States District Court for the District of Delaware, pp. 1-18, Apr. 9, 2010.
Exhibit 15, Deposition of James R. Miller in *Arendi Holding Ltd.* v. *Microsoft Corp*, CA No. 09-119-JJF, from United States District Court for the District of Delaware, pp. 1-36, Apr. 9, 2010.
Expert Report of Bruce Croft, in *Arendi Holding Ltd.* v. *Microsoft Corp*, CA No. 09-119-JJF, from United States District Court for the District of Delaware, pp. 1-166, Apr. 30, 2010.
Exhibit A, in Expert Report of Bruce Croft, in *Arendi Holding Ltd.* v. *Microsoft Corp*, CA No. 09-119-JJF, from United States District Court for the District of Delaware, pp. 1-30, Apr. 30, 2010.
Exhibit B, in Expert Report of Bruce Croft, in *Arendi Holding Ltd.* v. *Microsoft Corp*, CA No. 09-119-JJF, from United States District Court for the District of Delaware, pp. 1-15, Apr. 30, 2010.
Exhibit C, Expert Report of Bruce Croft ,in *Arendi Holding Ltd.* v. *Microsoft Corp*, CA No. 09-119-JJF, from United States District Court for the District of Delaware, pp. 1-90, Apr. 30, 2010.
Michael Bieber, "On Automating Hypertext Links in Knowledge-Based Decision Support Systems", Technical Report BCCS-90-08, pp. 1-22, Apr. 1990.
N. Streitz, A. Rizk and J. André, Hypertext: Concepts, Systems and Applications: Proceedings of the First European Conference on Hypertext, INRIA, France, pp. 1-8, Nov. 1990.
Michael Bieber, "Issues in Modeling a "Dynamic" Hypertext Interface", Technical Report BCCS-91-2, pp. 1-13, Apr. 1991.
Michael Bieber and Tomás Isakowitz, "Valuation Links: Extending the Computational Power of Hypertext", Technical Report BCCS-91-1, pp. 1-11, Apr. 1991.
Michael Bieber, Template-Driven Hypertext: A Methodology for Integrating a Hypertext Interface into Information Systems, Technical Report BCCS-91-3, pp. 1-23, Jun. 1991.
Michael Bieber and Steven O. Kimbrough, "On Generalizing the Concept of Hypertext", Technical report BCCS-91-5, pp. 1-11, Jun. 1991.
Michael Bieber and Tomás Isakowitz, "Bridge Laws in Hypertext a Logic Modeling Approach", Technical Report BCCS-91-4, pp. 1-30, Jun. 1991.
Michael Bieber, "On Merging Hypertext Into Dynamic, Non-Hypertext Systems", Technical Report BCCS-91-14, pp. 1-24, Nov. 8, 1991.
Mark Bernstein, Jay David Bolter, Michael Joyce and Elli Mylonas, "Architectures for Volatile Hypertext", Hypertext '91 Proceedings, pp. 243-280, Dec. 1991.
Michael Bieber "Providing Information Systems With Full Hypermedia Functionality", pp. 1-15, Oct. 1992.
Mail Address Change Notification, IBM Technical Disclosure Bulletin, vol. 36 No. 1, pp. 70-72, Jan. 1993.
D.D. Cowan, C.J.P. Lucena and R.G. Veitch, Towards CAAI: Computer Assisted Application Integration, Technical Report Series CS-93-17, University of Waterloo, pp. 1-23, Oct. 1993.
Herman Kaind and Stefan Kramer, Semiautomatic Generation of Dictionary Links in Hypertext, pp. 1-14, Feb. 1, 1995.

Michael Bieber, "On Integrating Hypermedia into Decision Support and Other Information Systems", Decision Support Systems 14, pp. 251-267, 1995.
Proceedings, Sixth Message Understanding Conference (MUC-6), pp. 1-64, Nov. 6-8, 1995.
Sargur N. Srihari, et al, "A System to Read Names and Addresses on Tax Forms", Proceedings of the IEEE, vol. 84, No's, Jul. 1996.
Ph. Bonnet and S. Bressan, "Extraction and Integration of Data from Semi-structured Documents into Business Applications", Sloan WP#3979, CISL WP# 97-12, pp. 1-9, Sep. 1997.
Borland, Russel, "Advance Self-Study Step by Step Microsoft Word 97 Advance Topics", Microsoft Press, 331 pages, 1997.
Microsoft Word Language Reference, Official Technical Reference to Visual Basic for Applications, Microsoft Press, 1133 pages, © 1997.
Microsoft PowerPoint and Microsoft Outlook Language References, Official Technical Reference to Visual Basic for Applications, Microsoft Press, vol. 4, 539 pages, 1997.
Microsoft Visual Basic for Applications and Shared Libraries References, vol. 5 of 5, Microsoft Press, 1005 pages, part No. 097-001685, © 1997.
Microsoft Office 97 Resource Kit, Technical Information and Tools for the Support Professional, Microsoft Press, 1162 pages, © 1997.
Microsoft Office 97 Reviewer's Guide, Professional Edition, 546 pages, Aug. 1996.
Running Microsoft Word for Windows 95, In Depth Reference and Inside Tips from the Software Experts, Russell Borland, Microsoft Press, 1040 pages, © 1995.
Running Microsoft Office 97, Standard and Professional, Michael Halvorson and Michael Young, Microsoft Press, 1130 pages, © 1997.
Microsoft Word 97, self-Study Kit, Covers Microsoft Word 97 for Windows 95 and Windows NT version 4.0, Microsoft Press, 314 pages, © 1997.
Microsoft Outlook 97, Step by Step, Self-Study Kit, Microsoft Press, 359 pages, © 1997.
VBA Developer's Handbook, Reusable Code, Visio Professional Demo Copy, and VB5CCE, 1997.
Microsoft97/Visual Basic Programmer's Guide, Microsoft Press, 548 pages, © 1997.
Microsoft Access Language Reference and Office Data Access Reference, Official Technical Reference to Visual Basic for Applications, Microsoft Press, 1287 pages, © 1997.
Microsoft Office97 Step by Step, Visual Basic, Developer's Self-Study Guide, Microsoft Press, 359 pages, © 1997.
Microsoft Office97 Developer's Handbook, Microsoft Press, Christine Solomon, 596 pages, © 1997.
Microsoft Word Developer's Kit, Microsoft Professional Editions, Third Edition, Manufacturing Copy $1^{st}$, Microsoft Press, 1106 pages, © 1995.
Inside Microsoft Word, vol. 4, No. 1, The Cobb Group, pp. 1-16, Jan. 1997.
Inside Microsoft Word, vol. 4, No. 2, The Cobb Group, pp. 1-16, Feb. 1997.
Inside Microsoft Word, vol. 4, No. 3, The Cobb Group, pp. 1-16, Mar. 1997.
Inside Microsoft Word, vol. 4, No. 4, The Cobb Group, pp. 1-16, Apr. 1997.
Inside Microsoft Word, vol. 4, No. 7, The Cobb Group, pp. 1-16, Jul. 1997.
Inside Microsoft Word, vol. 5, No. 9, ZD Journals, pp. 1-16, Sep. 1998.
Inside Microsoft Word, vol. 5, No. 10, ZD Journals, pp. 1-16, Oct. 1998.
Inside Microsoft Word, vol. 5, No. 11, ZD Journals, pp. 1-16, Nov. 1998.
Eudora Mail Pro, Version 3.0 for Windows, User Manual, QUALCOMM Incorporated, pp. 1-198, Jun. 1997.
Eudora Mail Pro, Version 3.1 for Macintosh, User Manual, QUALCOMM Incorporated, 199 pages, Jun. 1997.
Non-Confidential Redacted Jun. 11, 2010 Rebuttal Expert Report Richard Taylor, 311 pages, Jun. 11, 2010.
Spell Checking for Microsoft Windows, Palantir Software, 36 pages, © 1986.

(56) References Cited

OTHER PUBLICATIONS

Johannes, S., et al., "Active Messenger: Email Filtering and Mobile Delivery," *Massachusetts Institute of Technology*, Sep. 1999, pp. 1-122.
Srihari, S, et al., "A System to Read Names and Addresses on Tax Forms," *Proceedings of the IEEE*, vol. 14, No. 7, Jul. 1996, pp. 1038-1049.
Person et al., "Special Edition Using Microsoft Word 97" Que Publishing, pp. 476-514, Dec. 16, 1996.
U.S. Appl. No. 12/182,048, Notice of Allowance, 53 pages, Jan. 19, 2011.
U.S. Appl. No. 12/841,302, Notice of Allowance, 31 pages, Jan. 13, 2011.
Brangan, James R., "Department 1824 Job Card System: A New Web-Based Business Tool," *Sandia National Laboratories*, 50 pages, Feb. 1998.
Fox, Heidi, et al., "Learning to Extract and Classify Names from Text," *IEEE International Conference Systems, Man and Cybernetics*, vol. 2, pp. 1668-1673, Oct. 11-14, 1998.
Frank, Martin, et al., "Adaptive Forms: An Interaction Technique for Entering Structured Data," *University of Southern California, Information Sciences Institute*, 11 pages, Sep. 30, 1998.
Novasoft Systems, Infomax Messaging System v.2.0 User's Manual, 46 pages, Jul. 1, 1996.
U.S. Appl. No. 13/041,201, filed Mar. 4. 2011, 52 pages.
U.S. Appl. No. 12/987,840, filed Jan. 10, 2011, 52 pages.
U.S. Appl. No. 12/987,840, Accelerated Examination Support Document, 74 pages, Jan. 10, 2011.
U.S. Appl. No. 12/987,939, filed Jan. 10, 2011, 52 pages.
U.S. Appl. No. 12/987,939, Accelerated Examination Support Document, 72 pages, Jan. 10, 2011.
Plaintiff's Supplemental Opening Brief in Support of Its Proposed Claim Constructions, in *Arendi Holding Ltd.* v. *Microsoft Corp*, CA No. 09-119-LPS, from United States District Court for the District of Delaware, pp. 1-26, Jan. 21, 2011.
Microsoft Corporation's Supplemental Claim Construction Brief for Additional Terms to Be Construed, in *Arendi Holding Ltd.* v. *Microsoft Corp*, CA No. 09-119-LPS, from United States District Court for the District of Delaware, pp. 1-25, Jan. 21, 2011.
Plaintiff's Supplemental Answering Brief in Support of Its Proposed Claim Constructions, in *Arendi Holding Ltd.* v. *Microsoft Corp*, CA No. 09-119-LPS, from United States District Court for the District of Delaware, pp. 1-26, Feb. 4, 2011.
Microsoft Corporation's Responsive Supplemental Claim Construction Brief for Additional Terms to Be Construed, in *Arendi Holding Ltd.* v. *Microsoft Corp*, CA No. 09-119-LPS, from United States District Court for the District of Delaware, pp. 1-18, Feb. 4, 2011.
U.S. Appl. No. 13/111,639, filed May 19, 2011, 48 pages.
Microsoft Corporation's Answer, Affirmative Defenses and Counter Claims to Amended Complaint (including claims of inequitable conduct), in *Arendi Holding Ltd.* v. *Microsoft Corp*, CA No. 09-119-LPS, from United States District Court for the District of Delaware, pp. 1-17, May 19, 2011.
U.S. Appl. No. 11/745,186, Office Action, 13 pages, Mar. 16, 2011.
U.S. Appl. No. 13/111,639, Non-Final Office Action, 16 pages, Sep. 1, 2011.
U.S. Appl. No. 11/745,186, Interview Summary, 3 pages, Jul. 19, 2011.
U.S. Appl. No. 11/745,186, Response to Final Office Action, 31 pages, Jul. 22, 2011.
U.S. Appl. No. 11/745,186, Advisory Action Before the Filing of an Appeal Brief, 3 pages, Aug. 10, 2011.
U.S. Appl. No. 11/745,186, Interview Summary, 3 pages, Aug. 15, 2011.
U.S. Appl. No. 11/745,186, Supplemental Response After Final Amendment, 33 pages, Aug. 16, 2011.
U.S. Appl. No. 11/745,186, Advisory Action Before Filing an Appeal Brief, 4 pages, Sep. 9, 2011.
U.S. Appl. No. 11/745,186, Supplemental Response H, 28 pages, Sep. 9, 2011.
U.S. Appl. No. 11/745,186, Applicant Initiated Summary, 3 pages, Sep. 16, 2011.
U.S. Appl. No. 13/041,210, Office Action, 64 pages, issued Jan. 9, 2012.
U.S. Appl. No. 13/111,639, Office Action, 60 pages, issued Sep. 1, 2011.
U.S. Appl. No. 13/111,639, Response A, 24 pages, filed Sep. 21, 2011.
U.S. Appl. No. 13/111,639, Office Action, 36 pages, issued Nov. 10, 2011.
U.S. Appl. No. 13/111,639, Office Action, 3 pages, issued Nov. 28, 2011.
U.S. Appl. No. 13/111,639, Response B, 19 pages, filed Dec. 9, 2011.
U.S. Appl. No. 13/111,639, Advisory Action, 3 pages, issued Dec. 22, 2011.
U.S. Appl. No. 12/987,840, Office Action, 49 Pages, issued Oct. 11, 2011.
U.S. Appl. No. 12/987,840, Appeal Brief, 36 pages, filed Jan. 11, 2012.
U.S. Appl. No. 12/987,840, Response to Notice of Non-Compliant Appeal Brief, 7 pages, filed Feb. 22, 2012.
U.S. Appl. No. 12/987,840, Examiner's Answer, 19 pages, issued Mar. 9, 2012.
U.S. Appl. No. 12/987,939, Office Action, 48 pages, issued Oct. 11, 2011.
U.S. Appl. No. 12/987,939, Appeal Brief, 33 pages, filed Jan. 11, 2012.
U.S. Appl. No. 12/987,939, Examiner's Answer, 18 pages, issued Feb. 27, 2012.
U.S. Appl. No. 11/745,186, Advisory Action Before Filing of Appeal Brief, 3 pages, issued Sep. 22, 2011.
U.S. Appl. No. 11/745,186, Third Supplement to Response H, 37 pages, filed Nov. 3, 2011.
U.S. Appl. No. 11/745,186, Response, 111 pages, Apr. 22, 2011.
U.S. Appl. No. 13/111,639, filed May 19, 2011, 48 pages, May 19, 2011.
U.S. Appl. No. 13/111,639, Accelerated Examination Support Document, 160 pages, May 19, 2011.
U.S. Appl. No. 12/987,840, Office Action, 13 pages, Jun. 10, 2011.
U.S. Appl. No. 12/987,939, Office Action, 42 pages, Jun. 10, 2011.
U.S. Appl. No. 11/745,186, Final Office Action, 13 pages, Jun. 3, 2011.
U.S. Appl. No. 12/987,840, Reply Brief, 27 pages, filed May 9, 2012.
U.S. Appl. No. 13/111,639, Response C, 32 pages, filed Feb. 10, 2012.
U.S. Appl. No. 13/111,639, Interview Summary, 3 pages, issued Feb. 24, 2012.
U.S. Appl. No. 12/987,939, Reply Brief, 26 pages, filed Apr. 27, 2012.
U.S. Appl. No. 13/041,210, Interview Summary, 4 pages, issued Feb. 24, 2012.
U.S. Appl. No. 13/041,210, Response A, 35 pages, filed Jun. 7, 2012.
U.S. Appl. No. 13/041,210, Interview Summary, 3 pages, issued Jun. 28, 2012.
U.S. Appl. No. 13/041,210, Office Action, 30 pages, issued Aug. 10, 2012.
U.S. Appl. No. 13/041,210, Response B, 35 pages, filed Oct. 17, 2012.
U.S. Appl. No. 13/041,210, Interview Summary, 4 pages, issued Oct. 24, 2012.
U.S. Appl. No. 13/041,210, Advisory Action, 3 pages, issued Nov. 5, 2012.
U.S. Appl. No. 13/041,210, Response C, 34 pages, filed Nov. 13, 2012.
U.S. Appl. No. 13/041,210, Office Action, 21 pages, issued Jun. 20, 2013.
U.S. Appl. No. 13/041,210, Response D, 15 pages, filed Jul. 17, 2013.
U.S. Appl. No. 13/041,210, Office Action, 24 pages, issued Aug. 30, 2013.
U.S. Appl. No. 13/041,210, Office Action, 24 pages, issued Sep. 6, 2013.
U.S. Appl. No. 13/449,086, filed Apr. 17, 2012, 47 pages.

(56) References Cited

OTHER PUBLICATIONS

U.S. Appl. No. 13/449,086, Office Action, 15 pages, issued Aug. 9, 2012.
U.S. Appl. No. 13/449,086, Response A, 31 pages, filed Oct. 17, 2012.
U.S. Appl. No. 13/449,086, Interview Summary, 4 pages, issued Oct. 24, 2012.
U.S. Appl. No. 13/449,086, Office Action, 14 pages, issued Nov. 8, 2012.
U.S. Appl. No. 13/449,086, Interview Summary, 3 pages, issued Dec. 28, 2012.
U.S. Appl. No. 13/449,086, Response After Final, 12 pages, filed Feb. 1, 2013.
U.S. Appl. No. 13/449,086, Advisory Action, 3 pages, issued Feb. 15, 2013.
U.S. Appl. No. 13/449,086, Response and RCE, 10 pages, filed Mar. 25, 2013.
U.S. Appl. No. 13/449,086, Office Action, 18 pages, issued Jul. 18, 2013.
U.S. Appl. No. 13/041,210, Appeal Brief, 32 pages, filed Oct. 22, 2013.
U.S. Appl. No. 13/041,210, Examiner's Answer to Appeal Brief, 29 pages, issued Nov. 7, 2013.
U.S. Appl. No. 13/041,210, Reply Brief, 23 pages, filed Jan. 6, 2014.
U.S. Appl. No. 13/449,086, Response D, 12 pages, filed Jan. 17, 2014.
U.S. Appl. No. 13/449,086, Office Action, 24 pages, issued Feb. 7, 2014.
U.S. Appl. No. 13/449,086, Appeal Brief, 34 pages, mailed Jun. 4, 2014.
U.S. Appl. No. 13/449,086, Notification of Non-Compliant Appeal Brief, 2 pages, issued Jun. 16, 2014.
U.S. Appl. No. 13/449,086, Response to Notification of Non-Compliant Appeal Brief, 38 pages, filed Jul. 9, 2014.
Allison, D., Declaration of Dennis R. Allison, re: U.S. Pat. No. 8,306,993, Petition for Inter Partes Review, *Motorola Mobility LLC, et al v. Arendi*, IPR2014-00203, dated Dec. 1, 2013, 103 pages.
Allison, D., Curriculum vitae of Dennis Allison, 3 pages.
Allison, D., Declaration of Dennis R. Allison, re: U.S. Pat. No. 7,921,356, Petition for Inter Partes Review, *Google, Inc. v. Arendi*, IPR2014-00450, dated Feb. 14, 2014, 115 pages.
Allison, D., Declaration of Dennis R. Allison, re: U.S. Pat. No. 6,323,853, Petition for Inter Partes Review, *Google, Inc. and Motorola Mobility LLC v. Arendi*, IPR2014-00452, dated Feb. 20, 2014, 134 pages.
Clark, P., Declaration of Paul D. Clark, D.S.C., re: U.S. Pat. No. 8,306,993, Petition for Inter Partes Review, *Samsung Electronics Co., Ltd. V. Arendi*, IPR2014-00214, dated Dec. 3, 2013, 33 pages.
Clark, P., Curriculum vitae of Paul C. Clark, D.Sc., 3 pages.
Cohen, D, Declaration of Diana Cohen and Tabs A-F referenced therein re: U.S. Pat. No. 5,946,647, Request for Ex Parte Reexamination, dated Oct. 14, 2010, 335 pages, prepared for and filed in Ex Parte Reexamination Control No. 90/011,287, 335 pages.
Magnanelli, M., et al, "Academia: An Agent-Maintained Database based on Information Extraction from Web Documents" Institute for Information Systems, Swiss Federal Institute of Technology (ETH), ETH-Zentru, CH-8092 Zurich, Switzerland, 6 pages.
Menasce, D., Declaration of Daniel A. Menasce, Ph.D. re: U.S. Pat. No. 7,496,854, Petition for Inter Partes Review, *Apple Inc., et al v. Arendi*, IPR2014-00207, dated Dec. 2, 2013, 275 pages.
Menasce, D., Declaration of Daniel A. Menasce, Ph.D. re: U.S. Pat. No. 7,496,854 Petition for Inter Partes Review, *Apple Inc., et al v. Arendi*, IPR2014-00206, dated Dec 2, 2013, 266 pages.
Menasce, D., Declaration of Daniel A. Menasce, Ph.D. re: U.S. Pat. No. 7,917,843, Petition for Inter Partes Review, *Apple Inc., et al v. Arendi*, IPR2014-00208, dated Dec. 2, 2013, 252 pages.
Miller, J., "An Overview of the ATG Intelligent Systems Program" *SIGCHI Bulletin*, Apr. 1998, vol. 30, No. 2, ISSN 0736-6906, pp. 51-52, 2 pages.

Pensoft Corp., "Perspective Handbook", First Edition, Nov. 1992, 289 pages.
Stearns, B., "Technote: The Compleat Guide to Simple Text", *Wayback Machine*, Jan. 17, 1999, 6 pages, http://developer.apple.com/technotes/tn/tn/1005.html.
ETH Zurich/Computer Science/Publications Listing, *Wayback Machine*, Feb. 10, 1998, 66 pages, http://flp.inf.ethz.ch/publications/papers.html.
Conference Schedule, 14th European Meeting on Cybernetics and Systems Research, Apr. 15, 1998, 1 page.
Miller, et al, "From Documents to Objects—An Overview of LiveDoc", SIGCHI Bulletin, vol. 30, No. 2, Apr. 1998, pp. 53-58, 6 pages.
U.S. Pat. No. 7,496,854, IPR 2014-00207, Petition for Inter Partes Review, *Apple Inc., et al v. Arendi*, filed Dec. 2, 2013, 63 pages.
U.S. Pat. No. 7,496,854, IPR 2014-00207, Patent Owner Arendi S.A.R.L.'s Preliminary Response, filed Mar. 12, 2014, 68 pages.
U.S. Pat. No. 7,496,854, IPR2014-00207—Decision Institution of Inter Partes Review, filed Jun. 11, 2014, 25 pages.
U.S. Pat. No. 7,496,854, IPR 2014-00206, Petition for Inter Partes Review, *Apple Inc., et al v. Arendi*, filed Dec. 2, 2013, 64 pages.
U.S. Pat. No. 7,496,854, , IPR2014-00206, Patent Owner Arendi S.A.R.L.'s Preliminary Response, filed Mar. 12, 2014, 75 pages.
U.S. Pat. No. 7,496,854, IPR2014-00206, Decision Institution of Inter Partes Review, filed Jun. 11, 2014, 23 pages.
U.S. Pat. No. 7,917,843, IPR 2014-00208, Petition for Inter Partes Review, *Apple Inc., et al v. Arendi*, filed Dec. 2, 2013, 61 pages.
U.S. Pat. No. 7,917,843, IPR 2014-00208, Patent Owner Arendi S.A.R.L.'s Preliminary Response, filed Mar. 12, 2014, 68 pages.
U.S. Pat. No. 7,917,843, IPR 2014-00208, Decision Institution of Inter Partes Review, filed Jun. 11, 2014, 20 pages.
U.S. Pat. No. 8,306,993, IPR 2014-00203, Petition for Inter Partes Review, *Motorola Mobility LLC, et al v. Arendi*, dated Dec. 2, 2013, 64 pages.
U.S. Pat. No. 8,306,993, IPR 2014-00203, Corrected Petition for Inter Partes Review, *Motorola Mobility LLC, et al v. Arendi*, dated Dec. 17, 2013, 64 pages.
U.S. Pat. No. 8,306,993, IPR 2014-00203, Patent Owner Arendi's Preliminary Response, dated Mar. 12, 2014, 103 pages.
U.S. Pat. No. 8,306,993, IPR 2014-00203, Decision Denying Institution of Inter Partes Review, dated Jun. 5, 2014, 24 pages.
U.S. Pat. No. 8,306,993, IPR 2014-00203, Petitioner's Request for Rehearing, dated Jul. 7, 2014, 19 pages.
U.S. Pat. No. 8,306,993, IPR 2014-00203, Decision on Request for Rehearing, dated Jul. 25, 2014, 6 pages.
U.S. Pat. No. 8,306,993, IPR 2014-00214, Petition for Inter Partes Review, *Samsung Electronics Co., Ltd. v. Arendi*, dated Dec. 3, 2013, 33 pages.
U.S. Pat. No. 8,306,993, IPR 2014-00214, Corrected Petition for *Inter Partes* Review, *Samsung Electronics Co., Ltd. v. Arendi*, dated Dec. 11, 2013, 66 pages.
U.S. Pat. No. 8,306,993, IPR 2014-00214, Patent Owner Arendi's Preliminary Response, filed Mar. 11, 2014, 83 pages.
U.S. Pat. No. 8,306,993, IPR 2014-00214, Decision Denying Institution of Inter Partes Review, filed May 28, 2014, 20 pages.
U.S. Pat. No. 7,921,356, IPR2014-00450, Petition for Inter Partes Review, *Google Inc. v. Arendi*, filed Feb. 20, 2014, 65 pages.
Allison, D., U.S. Pat. No. 7,921,356, IPR2014-00450, Declaration of Dennis R. Allison, filed Feb. 20, 2014, 115 pages.
U.S. Pat. No. 7,921,356, IPR2014-00450, Patent Owner Arendi's Preliminary Response, filed May 23, 2014, 45 pages.
U.S. Pat. No. 6,323,853, IPR2014-00452, Petition for Inter Partes Review, *Google Inc., et al v. Arendi*, filed Feb. 21, 2014, 63 pages.
U.S. Pat. No. 6,323,853, IPR2014-00452, Declaration of Dennis R. Allison, filed Feb. 21, 2014, 134 pages.
Padwick, et al, "Using Microsoft Outlook 97", *Microsoft Press 1996*, Chapters 1, 8-9, 12-13, 19-20, 22, 24, 248 pages.
"Structure of the LC Control Number", http://www.loc.gov/marc/lccn_structure.html, 10 pages.
U.S. Pat. No. 6,323,853, IPR2014-00452, Patent Owner Arendi's Preliminary Response, filed May 22, 2014, 40 pages.

(56) References Cited

OTHER PUBLICATIONS

U.S. Pat. No. 7,917,843, IPR2014-01142, Petition for Inter Partes Review, *Samsung Electronics Co., Ltd.* V. *Arendi*, filed Jul. 11, 2014, 35 pages.
Clark, C., U.S. Pat. No. 7,917,843, IPR2014-01142, Declaration of Paul C. Clark, dated Jul. 8, 2014, 16 pages.
Merriam-Webster's collegiate Dictionary, Tenth Edition, 1999, p. 242, 3 pages.
U.S. Pat. No. 7,496,854, IPR2014-01143, Petition for Inter Partes Review, *Samsung Electronics co., Ltd.* V. *Arendi*, filed Jul. 11, 2014, 37 pages.
Clark, C., U.S. Pat. No. 7,496,854, IPR2014-01143, Declaration of Paul C. Clark, D.SC., dated Jul. 8, 2014, 12 pages.
News Articles on Spell Catcher™ (1996), 7 pages.
U.S. Pat. No. 7,496,854, IPR2014-01144, Petition for Inter Partes Review, *Samsung Electronics, Ltd.* V. *Arendi*, dated Jul. 11, 2014, 49 pages.
Clark, C., U.S. Pat. No. 7,496,854, IPR2014-01144, Declaration of Paul C. Clark, D.SC., Jul. 8, 2014, 16 pages.
U.S. Pat. No. 7,921,356, IPR 2014-00450, Supplemental Mandatory Response, *Google Inc.* v. *Arendi*, Apr. 1, 2014, 4 pages.
U.S. Pat. No. 7,496,854, IPR 2014-01143, Samsung's Reply to Arendi's Opposition to Motion for Joinder, *Samsung Electronics* v. *Arendi*, Aug. 11, 2014, 5 pages.
U.S. Pat. No. 7,917,843, IPR 2014-01142, Patent Owner Arendi SARL Preliminary Response, *Samsung Electronics* v. *Arendi*, entered Aug. 11, 2014, 30 pages.
U.S. Pat. No. 7,496,854, IPR 2014-01144, Samsung's Reply to Arendi's Opposition to Motion for Joinder , *Samsung Electronics* v. *Arendi*, , entered Aug. 11, 2014, 5 pages.
U.S. Pat. No. 7,917,843, IPR 2014-01142. Samsung's Reply to Arendi's Opposition to Motion for Joinder , *Samsung Electronics* v. *Arendi*, , entered Aug. 11, 2014, 6 pages.
U.S. Pat. No. 7,496,854, IPR 2014-01143, Arendi's Opposition to Motion for Joinder, *Samsung Electronics* v. *Arendi*, IPR 2014-01143, entered Aug. 4, 2014, 11 pages.
Arendi's Opposition to Motion for Joinder, *Samsung Electronics* v. *Arendi*, IPR 2014-01144, entered Aug. 4, 2014, 10 pages.
The American Heritage College Dictionary, Third Edition, 1997, 1993, 3 pages [Exhibit 2001, 2002].
Boyer, R., "A Fast String Searching Algorithm," *Communications of the ACM*, vol. 20, No. 10, pp. 762-772, Oct. 1977, 11 pages.
User Manual for Addressmate and Addressmate Plus, 226 pages.
U.S. Pat. No. 6,323,853 B1, IPR 2014-00452, Decision Institution of Inter Partes Review, filed Aug. 20, 2014, 25 pages.
U.S. Pat. No. 7,917,843, IPR2014-01142, *Samsung Electronics Co., Ltd.,* v. *Arendi*, Arendi's Opposition to Motion for Joinder, entered Jul. 11, 2014, 11 pages.
U.S. Pat. No. 7,917,843, IPR2014-01142, *Samsung Electronics Co., Ltd.,* v. *Arendi*, Arendi's Opposition to Motion for Joinder filed by Samsung Electronics Co., Ltd., Samsung Electronics America, Inc and Samsung Telecommunications America, LLC. entered Aug. 4, 2014, 17 pages.
Stephen, "String Search", Technical Report TR-92-gas-01, School of Electronic Engineering Science, University College of North Wales, 143 pages, Oct. 1992.
U.S. Pat. No. 7,496,854, IPR2014-00207, *Apple Inc., Google, Inc. and Motorola Mobility LLC* v. *Arendi*, Patent Owner Arendi S.A.R.L.'s Response entered Aug. 26, 2014, 52 pages.
U.S. Pat. No. 7,917,843, IPR2014-00208, *Apple Inc., Google, Inc. and Motorola Mobility LLC* v. *Arendi*, Patent Owner Arendi S.A.R.L.'s Response Entered Aug. 26, 2014, 35 pages.
U.S. Pat. No. 7,496,854, IPR2014-00206, *Apple Inc., Google, Inc. and Motorola Mobility LLC* v. *Arendi*, Patent Owner Arendi S.A.R.L.'s Response Entered Aug. 26, 2014, 51 pages.
U.S. Pat. No. 7,496,854, IPR 2014-01143, Samsung's Motion for Joinder, entered Jul. 11, 2014, 11 pages.
U.S. Pat. No. 7,496,854, IPR 2014-01144, Samsung's Motion for Joinder, entered Jul. 11, 2014, 12 pages.
U.S. Pat. No. 7,496,854, IPR 2014-01144, Samsung's Expedited Date for Patent Owner Preliminary Response, entered Sep. 5, 2014, 3 pages.
U.S. Pat. No. 7,496,854, IPR 2014-01143, Samsung's Expedited Date for Patent Owner Preliminary Response, entered Sep. 5, 2014, 3 pages.
U.S. Pat. No. 7,496,854, IPR 2014-01144, Patent Owner Arendi's S.A.R.L.'s Preliminary Response Under 35 U.S.C. § 313 and 37 C.F.R. § 42.107, entered Sep. 24, 2014, 8 pages.
U.S. Pat. No. 7,496,854, IPR 2014-01143, Patent Owner Arendi's S.A.R.L.'s Preliminary Response Under 35 U.S.C. § 313 and 37 C.F.R. § 42.107, entered Sep. 24, 2014, 8 pages.
U.S. Pat. No. 7,921,356, IPR2014-00450, Patent Owner Arendi's S.A.R.L.'s Response Under 37 C.F.R. § 42.120, entered Nov. 4, 2014, 47 pages.
U.S. Pat. No. 6,323,853, IPR2014-00452, Patent Owner Arendi's S.A.R.L.'s Response Under 37 C.F.R. § 42.120, entered Nov. 4, 2014, 63 pages.
U.S. Pat. No. 7,496,854, IPR2014-00206, *Apple Inc., Google Inc. and Motorola Mobility LLC* v. *Patent Owner Arendi's S.A.R.L.'s* Petitioners Reply to Patent Owner's Response, entered Nov. 11, 2014, 20 pages.
*Apple Inc., Google, Inc., and Motorola Mobility LLC* v. *Patent Owner Arendi S.A.R.L.*, Deposition of John V. Levy, Ph. D., entered on Oct. 22, 2014, 72 pages—IPR2014-00206, U.S. Pat. No. 7,496,854 (Exhibit 1011); IPR2014-00207, U.S. Pat. No. 7,496,854 (Exhibit 1013); IPR2014-00208, U.S. Pat. No. 7,917,843.
*Apple Inc., Google, Inc., and Motorola Mobility LLC* v. *Patent Owner Arendi S.A.R.L.*, Deposition of Daniel A. Menasce, Ph.D., entered on Aug. 7, 2014, 60 pages—IPR2014-00206, U.S. Pat. No. 7,496,854 (Exhibit 1011); IPR2014-00207, U.S. Pat. No. 7,496,854 (Exhibit 1013); IPR2014-00208, U.S. Pat. No. 7,917,843.
U.S. Pat. No. 7,496,854, IPR2014-00207, *Apple Inc., Google Inc. and Motorola Mobility LLC* v. *Patent Owner Arendi's S.A.R.L.'s* Petitioners Reply to Patent Owner's Response, entered Nov. 11, 2014, 21 pages.
U.S. Pat. No. 7,496,853, IPR2014-00208, *Apple Inc., Google Inc. and Motorola Mobility LLC* v. *Patent Owner Arendi's S.A.R.L.'s* Petitioners Reply to Patent Owner's Response, entered Nov. 11, 2014, 20 pages.
U.S. Pat. No. 7,496,854, IPR2014-00207, *Apple Inc., Google Inc., and Motorola Mobility LLC* v. *Arendi S.A.R.L.*, Final Written Decision entered Jun. 9, 2015, 21 pages.
U.S. Pat. No. 7,496,854, IPR2014-00206, *Apple Inc., Google Inc., and Motorola Mobility LLC* v. *Arendi S.A.R.L.*, Final Written Decision entered Jun. 9, 2015, 22 pages.
U.S. Pat. No. 7,917,843, IPR2014-00208, *Apple Inc., Google Inc., and Motorola Mobility LLC* v. *Arendi S.A.R.L.*, Final Written Decision entered Jun. 9, 2015, 16 pages.
U.S. Appl. No. 12/987,840, Decision on Appeal entered Feb. 27, 2015, 11 pages.
U.S. Appl. No. 12/987,939, Decision on Appeal entered Mar. 3, 2015, 11 pages.
U.S. Appl. No. 13/041,210, Decision on Appeal entered Mar. 20, 2015, 18 pages.
U.S. Appl. No. 13/449,086, Decision on Appeal entered Mar. 23, 2015, 19 pages.
U.S. Appl. No. 12/987,840, Request for Rehearing of Decision of the Board, filed Apr. 14, 2015, 19 pages.
U.S. Appl. No. 12/987,939, Request for Rehearing of Decision of the Board, filed Apr. 14, 2015, 18 pages.
U.S. Appl. No. 12/987,939, Decision on Request for Rehearing, entered Jun. 3, 2015, 7 pages.
U.S. Appl. No. 13/041,210, Request for Rehearing of Decision of the Board, filed May 20, 2015, 26 pages.
U.S. Appl. No. 13/449,086, Request for Rehearing of Decision of the Board, filed May 22, 2015, 19 pages.

* cited by examiner

METHOD, SYSTEM AND COMPUTER READABLE MEDIUM FOR ADDRESSING HANDLING FROM AN OPERATING SYSTEM

CROSS REFERENCES TO RELATED APPLICATIONS

The present invention is a continuation of U.S. patent application Ser. No. 11/745,186, filed on May 7, 2007, which in turn is a continuation of U.S. patent application Ser. No. 09/390,303, filed on Sep. 3, 1999, now U.S. Pat. No. 7,272,604. All of these applications are incorporated herein, in their entireties, by reference.

BACKGROUND OF THE INVENTION

1. Field of the Invention

This invention relates to a method, system and computer readable medium for name and address handling (hereinafter called "address handling"), and more particularly to a touch screen, keyboard button, icon, menu, voice command device, etc. (hereinafter called "button") provided in a computer program, such as a word processing program, spreadsheet program, etc., or operating system, such as WINDOWS™ operating system, MACINTOSH™ operating system, etc., and coupled to an information management source for providing address handling within a document created by the computer program or within the operating system.

2. Discussion of the Background

In recent years, with the advent of programs, such as word processors, spreadsheets, etc. (hereinafter called "word processors") and operating systems, such as WINDOWS™ operating system, MACINTOSH™ operating system, etc., users may require retrieval of information, such as name and address information, etc., for insertion into a document, such a letter, fax, etc., created with the word processor or for contact management at the operating system level. Typically, the information is retrieved by the user from an information management source external to the word processor, such as a database program, contact management program, etc., or from the word processor itself, for insertion into the document. Examples of such word processors are WORD™, NOTEPAD™, EXCEL™, WORDPAD™, WORDPERFECT™, QUATROPRO™, AMIPRO™, etc., and examples of such information management sources are ACCESS™, OUTLOOK™, ORACLE™, DBASE™, RBASE™, CARDFILE™, etc.

However, the information in the database must constantly be updated by the user. This requires the user to learn how to use and have access to the database. In this case, a change in the information, such as change in an address or a name, etc., requires the user of the word processor to implement this change in the database, or alternatively, the change is made to the database centrally by a database administrator.

SUMMARY OF THE INVENTION

Accordingly, an object of the present invention is to provide a method, system and computer readable medium for address handling within a computer program or operating system.

Another object of the present invention is to provide a method, system and computer readable medium for address handling within a computer program, such as a word processing program, spreadsheet program, etc, or operating system, such as such as WINDOWS™ operating system, MACINTOSH™ operating system, etc.

Another object of the present invention is to provide a method, system and computer readable medium for address handling within a computer program or operating system, using an input device provided in the computer program.

Another object of the present invention is to provide a method, system and computer readable medium for address handling within a computer program or operating system, using an input device, such as a touch screen, keyboard button, icon, menu, voice command device, etc., provided in the computer program and coupled to an information management source.

Another object of the present invention is to provide a method, system and computer readable medium for address handling within a computer program or operating system using an input device provided in the computer program or operating system and coupled to local and/or remote information management source, such as a database program, contact management program, computer network, Internet site, etc.

Another object of the present invention is to provide a method, system and computer readable medium for address handling within a computer program or operating system using an input device provided in the computer program or operating system and coupled to local and remote information management source, such as a database program, contact management program, computer network, Internet site, etc., wherein data found in the local database is related to data found in the remote database.

The above and other objects are achieved according to the present invention by providing a novel method, system and computer readable medium for information handling within an operating system, including providing a record retrieval program; providing an input device within a window or screen of the operating system and configured to enter an execute command which initiates a record retrieval from local and remote information sources using the record retrieval program; using the record retrieval program to enter first information into search fields provided in the record retrieval program; entering the execute command using the input device after the step of entering the first information; searching, using the record retrieval program, the local and remote information sources for second information associated with the first information; and displaying the second information in the record retrieval program, when one of the local and remote information sources includes second information associated with the first information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

Figure 7:
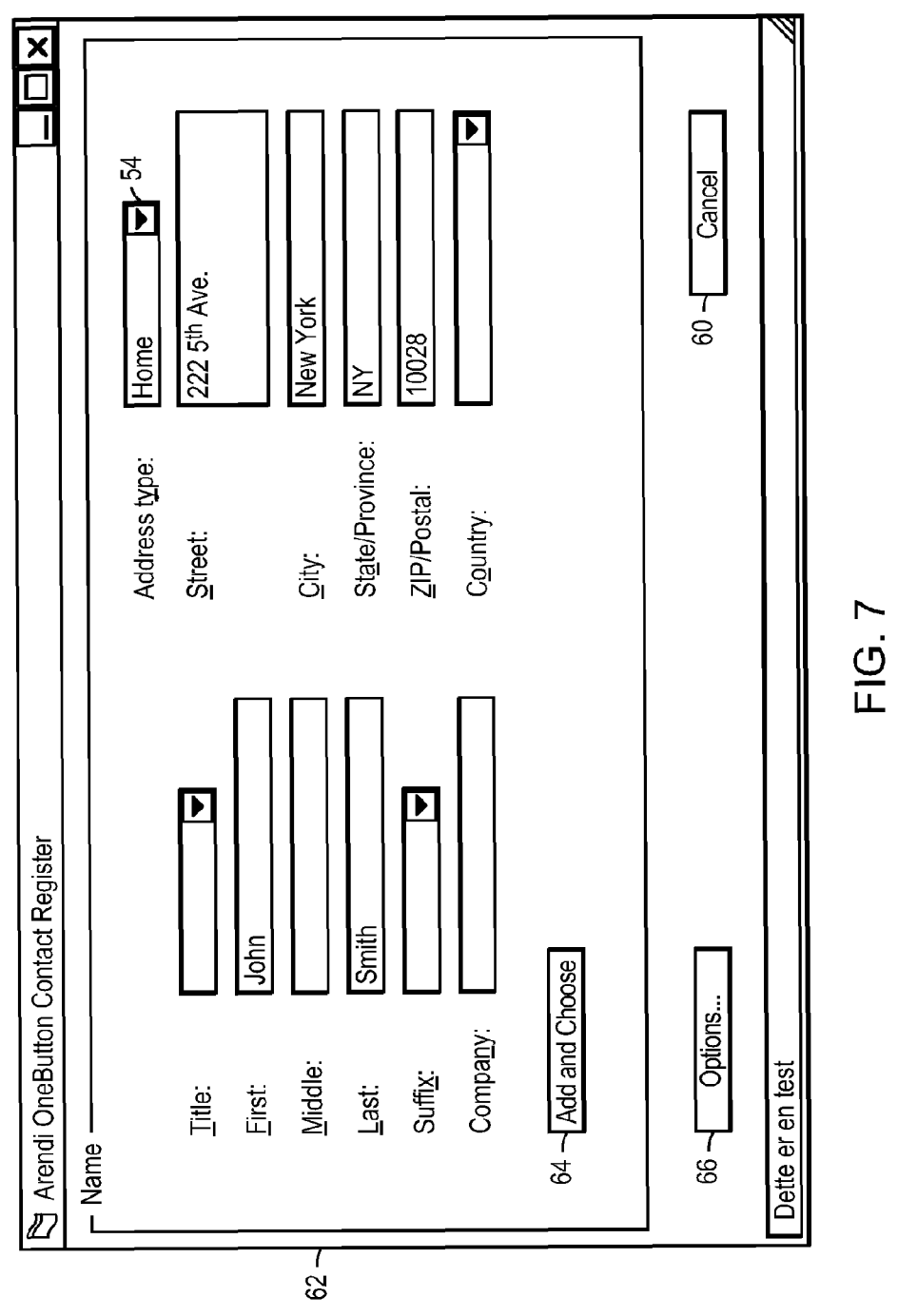

FIG. 7 is a screen shot illustrating a contact register message window, according to an exemplary embodiment of the present invention;

FIG. 10 is a screen shot illustrating a select a contact address register message window, according to an exemplary embodiment of the present invention;

FIG. 11 is a screen shot illustrating a more detailed mode of registering an additional address for the contact register of FIG. 9, according to an exemplary embodiment of the present invention;

FIG. 12 is a screen shot illustrating a contact management program window in a full detailed mode, according to an exemplary embodiment of the present invention;

DESCRIPTION OF THE PREFERRED EMBODIMENTS

Figure 1:
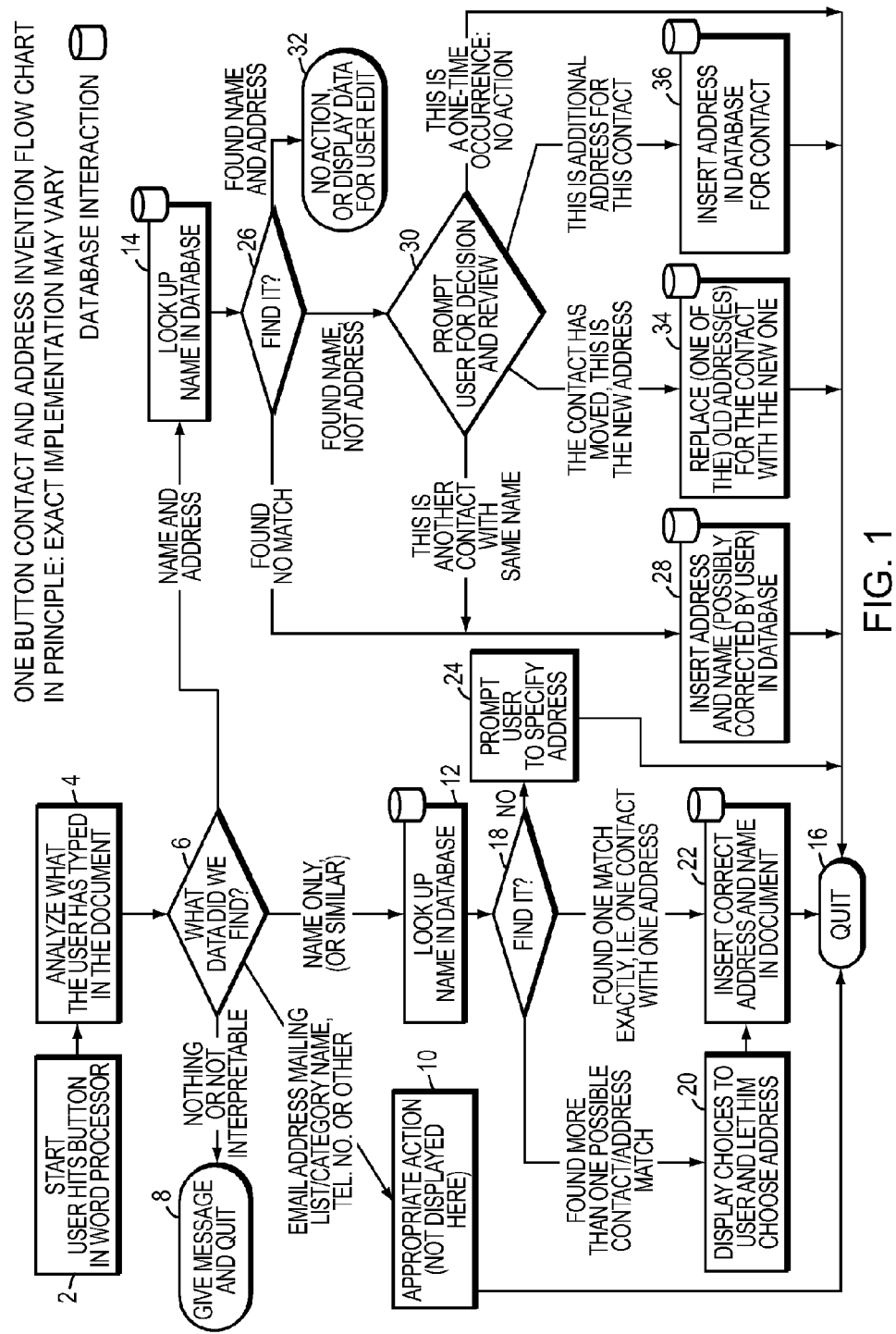
FIG. 1 is a flow chart illustrating a method for address handling within a computer program, according to an exemplary embodiment of the present invention.

In an embodiment of the present invention, single button addressing is achieved by providing an input device, such as a touch screen, keyboard, icon, menu, voice command device, etc. (hereinafter called "button"), in a computer program, such as a word processing program, spreadsheet program, etc. (hereinafter called "word processor"), or an operating system, such as WINDOWS™ operating system, MACINTOSH™ operating system, etc., for executing address handling therein.

Accordingly, in a word processor or operating system, the button is added and a user types information, such as an addressee's name, or a part of the name, etc. in a document created with the word processor, such as a letter, fax, etc., and then clicks, selects, commands, etc. the button via the appropriate input device, such as a touch screen button, keyboard button, icon, menu choice, voice command device, etc. A program then executes and retrieves the typed information from the document, and searches a local (i.e., the user's personal computer or an Intranet coupled to the user's personal computer) or remote (i.e., the Internet) information management source, such as a database, file, database program, contact management program, etc. (hereinafter called "database") to determine if the information, such as the name or part of the name typed and searched by the program exists in the database. If the program does not find stored information, such as a name, corresponding to the name or part of the name typed, the user is asked by the program whether the information, such as the name that was not found, should be added to the local database. In addition, the user may enter any other information besides the name, such as addresses, businesses, telephone numbers, fax numbers, e-mail address, etc., so that this other information can be stored in the local database for later use.

If the program finds name(s) and address(es) corresponding to the part of the addressee's name typed, this additional information is automatically entered into the user's word processor, optionally with a confirmation from the user that this is the correct data and stored in the local and/or remote database. If the typed address information does not correspond to data already stored in the local or remote database, after clicking on the button, the program, for example, lets the user decide: (1) if this is new data (e.g., a new address) for an existing contact; (2) if the stored data should be changed to what the user just typed; (3) if this is a new contact with the same name as one already entered into the database; or (4) if the typed address is only to be used once, and therefore not to be stored in the database at all. If, later, for example, a name with several address stored in the local or remote database is recalled, all addresses for this contact will be displayed, so that the correct address can be selected by the user.

The program may be extended to also store and retrieve other information, such as telephone numbers, fax numbers, e-mail addresses, etc. Once the program recalls the telephone numbers, fax numbers, e-mail addresses, etc., the user can command the program to send e-mails, faxes, etc. Similarly, if the user types in the name of a mailing list, the program create merge letters, group e-mails, etc.

Figure 2:
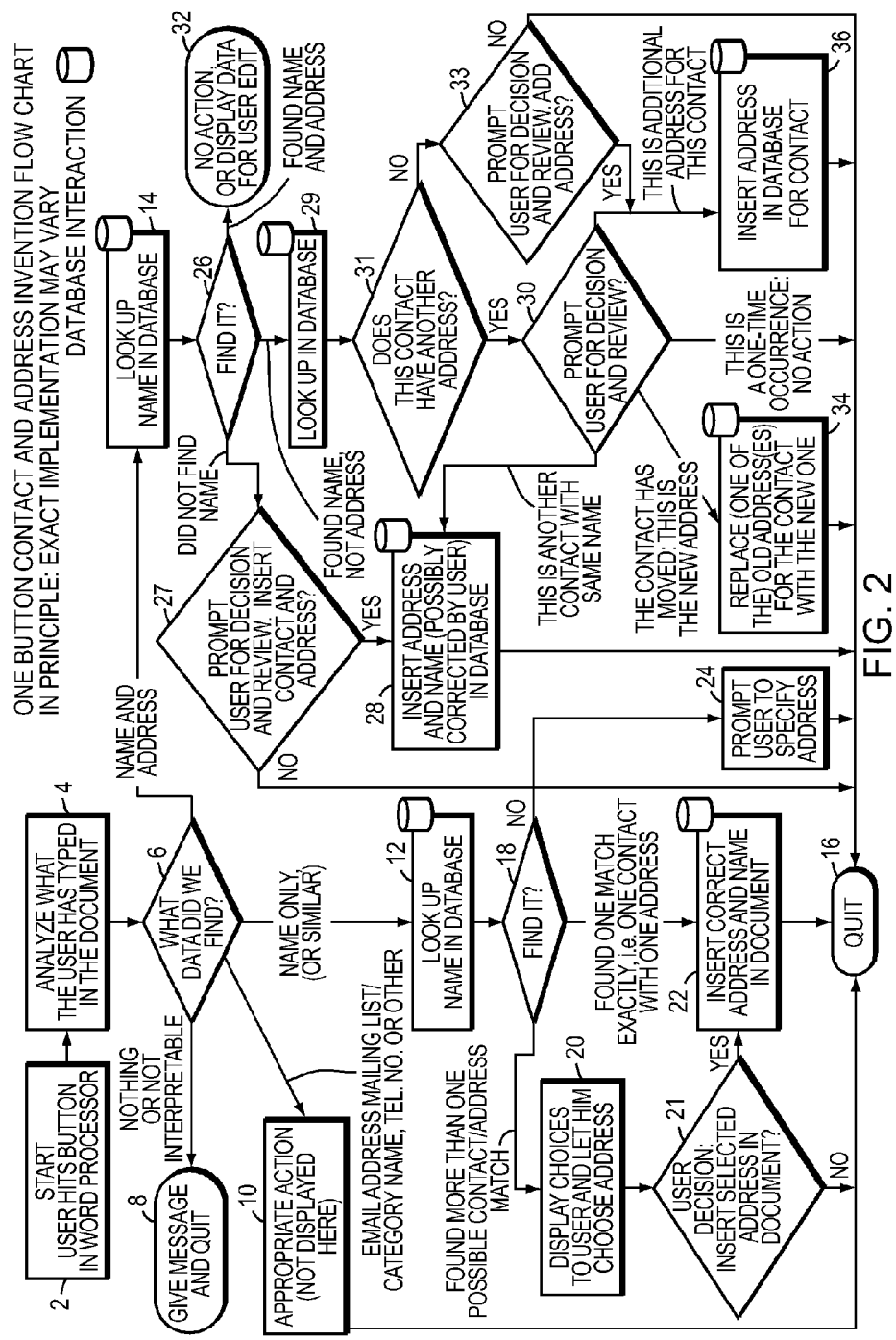
FIG. 2 is a flow chart illustrating a method for address handling within a computer program, according to another exemplary embodiment of the present invention.

Referring now to the drawings, wherein like reference numerals designate identical or corresponding parts throughout the several views, and more particularly to FIGS. 1 and 2 thereof, there is illustrated flow charts of single button addressing, according to exemplary embodiments of the present invention.

In FIG. 1, after the user has inserted the address in the word processor, the user commands the button at step 2 and the program analyzes what the user has typed in the document at step 4. At step 6, the program decides what was found in the document and if the program found nothing in the document or what it found was un-interpretable the program goes to step 8 and outputs an appropriate message to the user and then quits at step 16. The program analyzes what the user has typed in the document at step 4, for example, by analyzing (i) paragraph/line separations/formatting, etc.; (ii) street, avenue, drive, lane, boulevard, city, state, zip code, country designators and abbreviations, etc.; (iii) Mr., Mrs., Sir, Madam, Jr., Sr. designators and abbreviations, etc.; (iv) Inc., Ltd., P.C., L.L.C, designators and abbreviations, etc.; and (v) a database of common male/female names, etc.

If the program finds an e-mail address mailing list/category name telephone number or other information, at step 10 an appropriate action is performed by the program and then the program execution quits at step 16. If the program only finds a name or initials, or the like, the program looks up the name in the database at step 12 and at step 18 the program determines what was found. If the program finds more than one possible contact/address match, at step 20 the program displays menu choices to the user to let him choose an appropriate answer. Then at step 22 the program inserts a correct address and name in the document and then at step 16 the program quits execution. If the program finds one match exactly, i.e., one contact with one address, the program inserts the correct address and name in the document at step 22 and then quits execution at step 16. If the program does not find a name in the database, at step 24 the program prompts the user to specify an address and then quits execution at step 16. If the program at step 6 finds a name and an address, at step 14 the name is looked up in the database. Then, at step 26, if no match is found, at step 28 the program inserts an address and a name which are possibly corrected by the user into the database and then quits execution at step 16. If at step 26, the name and address is found, at step 32 the program either takes no action or displays the data for the user to edit. If at step 26, the name is found but not the address, the program prompts the user for a decision at step 30. If the user decides that this another contact with a same name, the program goes to step 28. If the user decides that this is a one time occurrence, no action is taken and the program quits at step 16. If the user decides that the contact has, for example, moved and that this is a new address, at step 34 one of the old addresses for the contact is replaced with the new one and the program quits at step 16. If the user decides that this is an additional address for the contact, at step 36 the additional address is inserted into the database for that contact and execution quits at step 16.

The flowchart shown in FIG. 2 is similar to the flowchart in FIG. 1, except for some additional steps which will now be discussed. At step 6, if the program only finds a name or a similar name then the name is looked up in the database at step 12, then at step 18 if the program found more than one possible contact/address match, the program displays choices to the user to let him choose an address at step 20. Then at step 21 the user decides whether to insert the selected address into the document. If the user does not decide to select the address into the document the program quits execution at step 16. If the user decides to insert the selected address into the document, the program inserts the address and name into the document at step 22 and then quits at step 16.

If the program finds a name and address in the database at step 6, then at step 14 the program looks up the name in the database and at step 26 the program determines what it has found. If the program does not find the name at step 26, at step 27 the program prompts the user for a decision and review and whether to insert the contact and address. If the user does not decide to insert the contact address, the program quits at step 16. If the user decides to insert the contact address, at step 28 the program inserts the address and name which may be possibly corrected by the user or program in the database and then execution quits at step 16.

If at step 26 the program finds a name and not an address, then at step 29 the name is looked up in the database. Then at step 31 the program decides whether this contact has another address. If the contact does not have another address, at step 33 the program prompts the user for a decision and review and whether to add the address. If the user does not want to add the address at step 33, the program quits at step 16. If the user wants to add the address at step 33 because this is an additional address for the contact, at step 36 the address is inserted in the database for the contact and execution quits at step 16.

At step 30, if the user decides that this is another contact with a same name, then the program goes to step 28. If at step 30 the user decides that this is a one time occurrence, then the program quits at step 16. If at step 30, the user decides that the contact has, for example, moved, the program goes to step 34. If at step 30, the user decides that this is an additional address for the contact, at step 36 the program inserts the address in the database for the contact and then quits at step 16.

Various exemplary screen shots which are generated during execution of the program, according to the present invention, will now be described with reference to FIGS. 3-15 and examples 1-7 as follows.

EXAMPLE 1

Retrieving an Existing Address from the Database

Figure 3:
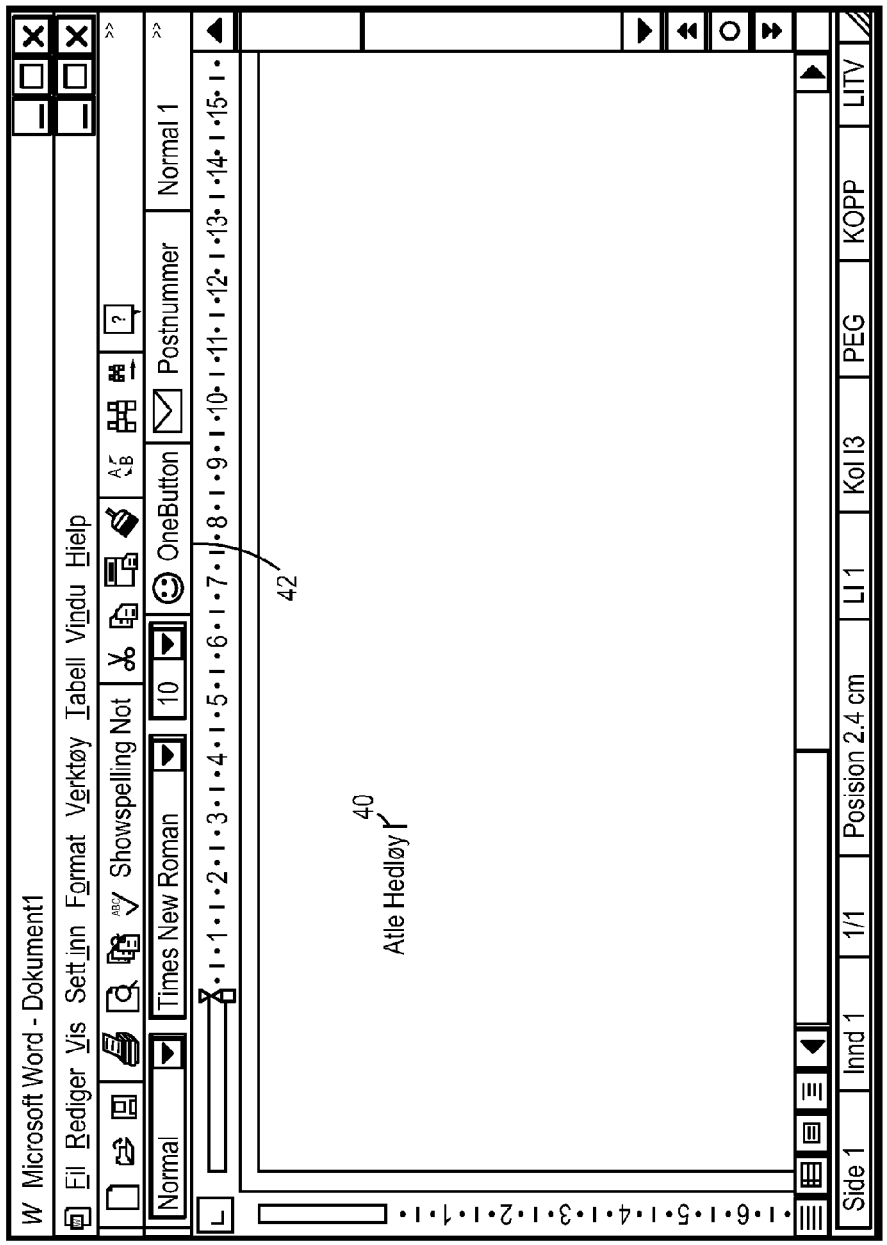
FIG. 3 is a screen shot illustrating the inputting of a name to be searched and an address handling button within a word processor, according to an exemplary embodiment of the present invention.

FIG. 3 illustrates a starting point in word processor document, such as a WORD™ document, wherein the user has typed a name 40. The user hits the button 42, for example, marked "OneButton" and the program according to the present invention retrieves the name 40 from the document, searches a database for the name 40, and inserts the retrieved address 44 associated with the name 40 into the document as shown in, for example, FIG. 4.

The above example corresponds to steps 2, 4, 6, 12, 18, 22 and 16 in the flow charts of FIGS. 1 and 2.

EXAMPLE 2

Adding a New Contact to the Database

Figure 5:
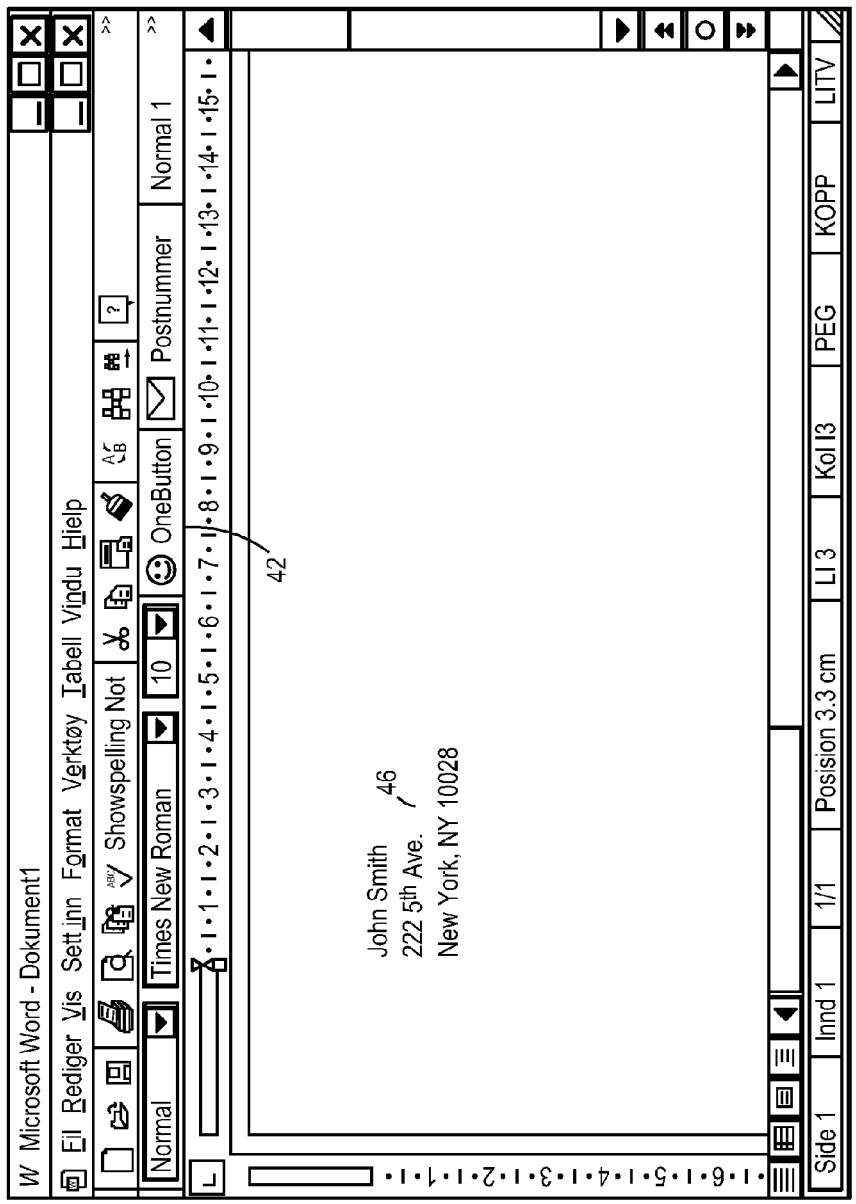
FIG. 5 is a screen shot illustrating the inputting of a name and address to be searched and an address handling button within a word processor, according to an exemplary embodiment of the present invention.
Figure 6:
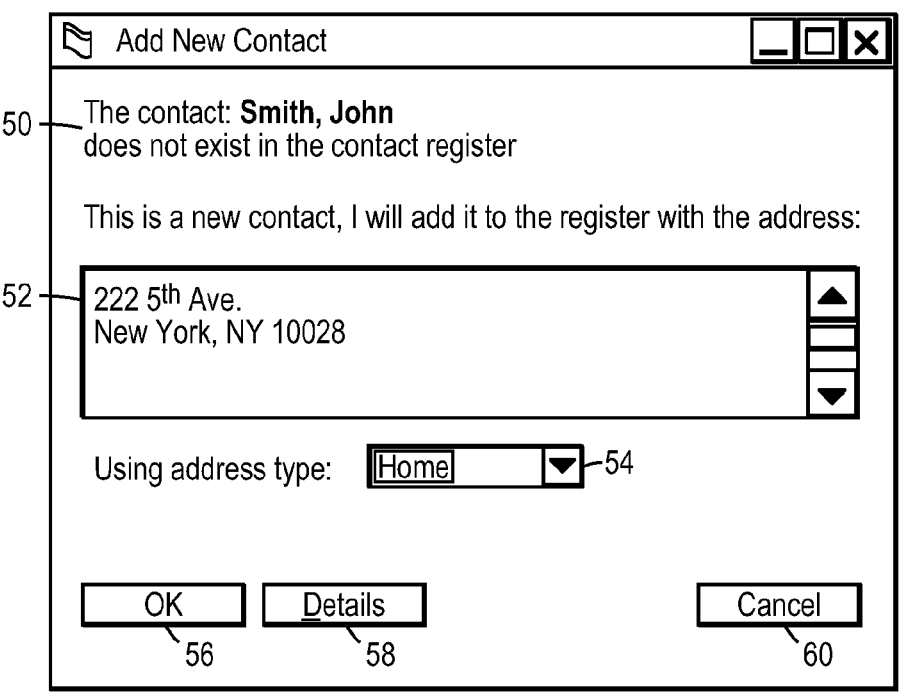
FIG. 6 is a screen shot illustrating an add new contact message window, according to an exemplary embodiment of the present invention.
Figure 8:
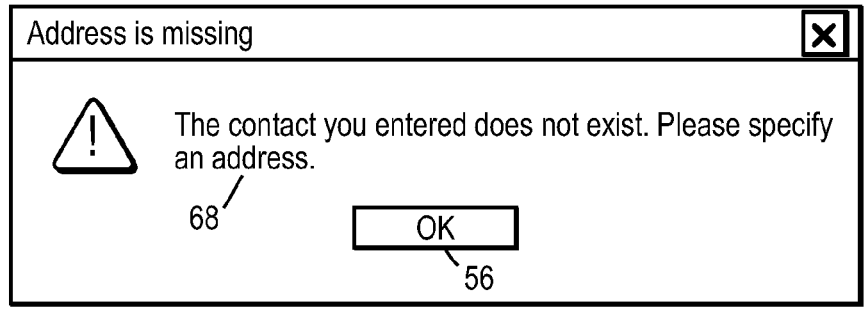
FIG. 8 is a screen shot illustrating an address missing message window, according to an exemplary embodiment of the present invention.
Figure 9:
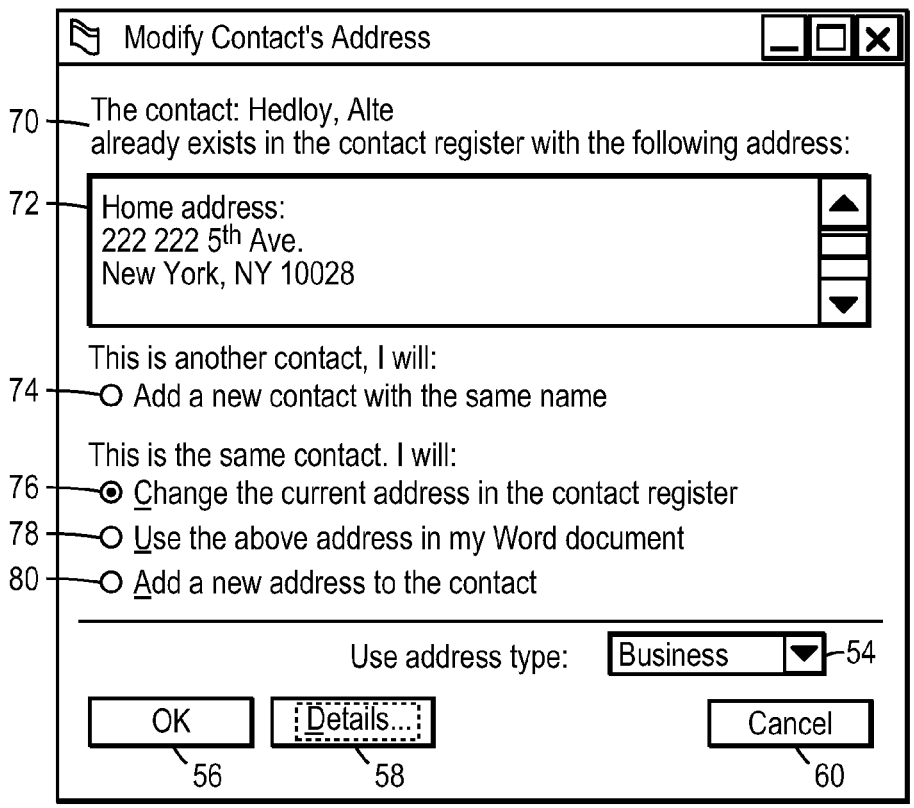
FIG. 9 is a screen shot illustrating a modify contact's address message window, according to an exemplary embodiment of the present invention.
Figure 13:
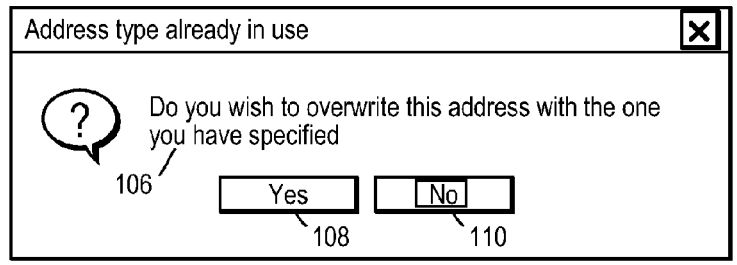
FIG. 13 is a screen shot illustrating an address already in use message window, according to an exemplary embodiment of the present invention.

FIG. 5 illustrates a starting point in word processor document, such as a WORD™ document, wherein the user has typed a name and address of a new contact 46. The user commands the button 42, for example, marked "OneButton," and the program according to the invention retrieves the new contact 46 from the document, searches a database for the name of the new contact 46 and generates a screen as shown in, for example, FIG. 6. This screen includes a message 50 informing the user that the new contact does not exist in the database, a message 52 including the address retrieved from the document, an address type selection 54, such as home, business, etc., and "OK," "Details," and "Cancel" buttons 56, 58, and 60, respectively.

At this point, the user can cancel the operation by commanding the Cancel button 60, ask the program to store data in the database and return to the document by commanding the OK button 56, or check details before storing data into the database by commanding the Details button 58. If the user commands the Details button 58, as shown in, for example, FIG. 7, a message screen is provided so that the user can review and edit data 62 and the selection 54, store the data 62 and 54 in the database by commanding a "Add and Choose" button 64, see more options by commanding an "Options" button 66, or cancel the operation by commanding the Cancel button 60.

The above example corresponds to steps 2, 4, 6, 14, 26, 28 and 16 in the flow chart of FIG. 1 and steps 2, 4, 6, 14, 26, 27, 28 and 16 in the flow chart of FIG. 2.

EXAMPLE 3

Try to Retrieve Existing Address, but Contact is Not in Database

FIG. 3 illustrates a starting point in word processor document, such as a WORD™ document, wherein the user has typed a name of a contact 40. The user commands the button 42, for example, marked "OneButton," and the program according to the present invention retrieves the name 40 from the document, searches a database for the name of the contact 40 and generates a screen as shown in, for example, FIG. 8. This screen includes a message 68 informing the user that the contact does not exist in the database and to specify an address, and "OK" buttons 56. At this point when the user commands the OK button 56, the user returns to the document so that the contact's address can be included as in Example 2 above.

The above example corresponds to steps 2, 4, 6, 12, 18, 24 and 16 in the flow charts of FIGS. 1 and 2.

EXAMPLE 4

Adding a New Address for an Existing Contact
(Short Version)

Figure 4:
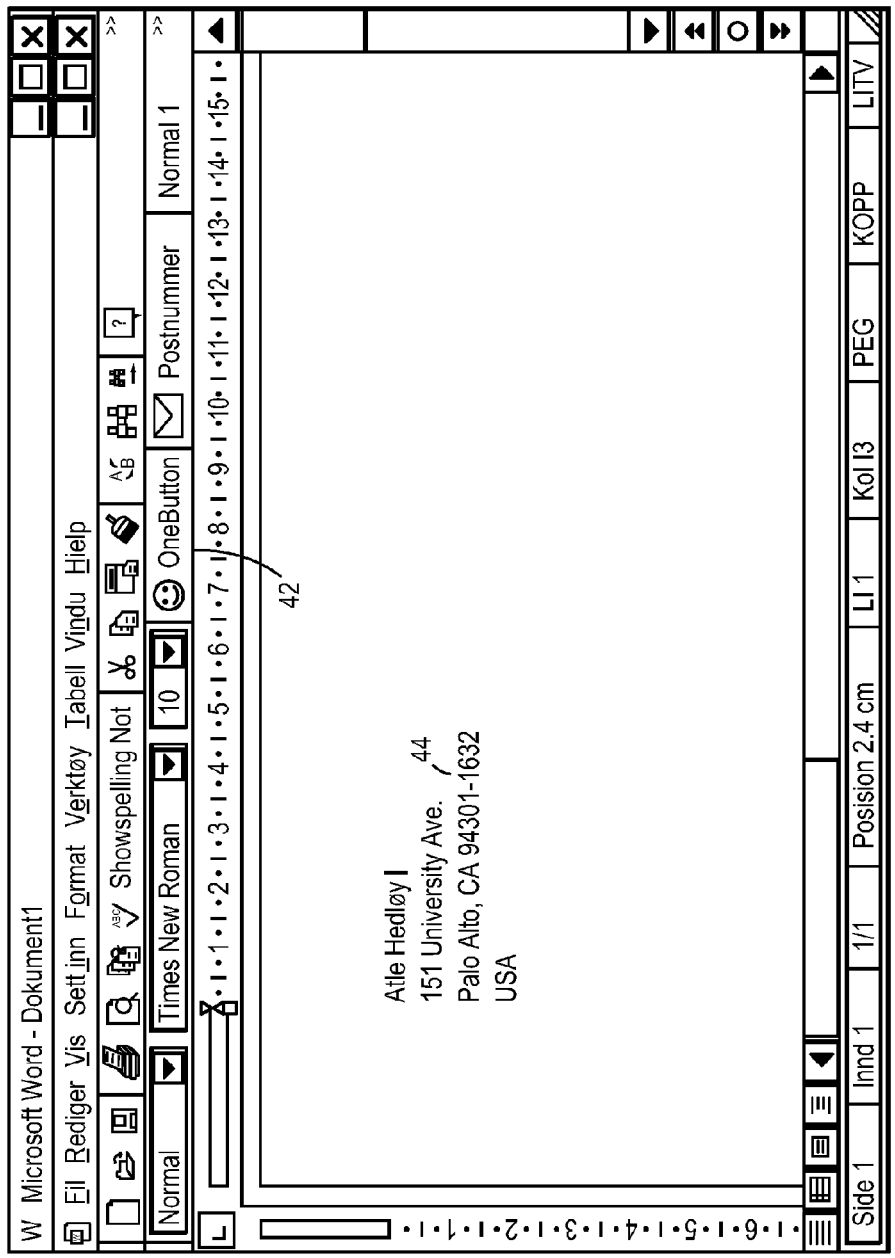
FIG. 4 is a screen shot illustrating a retrieved address in a word processor, according to an exemplary embodiment of the present invention.

FIG. 4 illustrates a starting point in word processor document, such as a WORD™ document, wherein the user has typed a name and new address of an existing contact 44. The user commands the button 42, for example, marked "OneButton," and the program according to the present invention retrieves the existing contact 44 from the document, searches a database for the name of the existing contact 44 and generates a screen as shown in, for example, FIG. 9. This screen includes a message 70 informing the user that the contact already exits in the database with an existing address, a message 72 including the existing address, add new contact with same name selection 74, change existing address selection 76, use existing address in document selection 78, add the new address to contact selection 80, the address type selection 54, such as home, business, etc., and the "OK," "Details,"and "Cancel" buttons 56, 58, and 60 respectively. At this point, the user may select one of the four options 74-80, and command the OK button 56 to execute the selected options. The user can also cancel the operation by commanding the Cancel button 60, or check details before storing data into the database by commanding the Details button 58.

The above example corresponds to steps 2, 4, 6, 14, 26, 28, 30, 34, 36, and 16 in the flow chart of FIG. 1 and steps 2, 4, 6, 14, 26, 29, 31, 30, 28, 34, 36, and 16 in the flow chart of FIG. 2.

EXAMPLE 5

Selecting Between Several Possible Matching Addresses

FIG. 3 illustrates a starting point in word processor document, such as a WORD™ document, wherein the user has typed a name and possibly address of at least one existing contact 40. The user commands the button 42, for example, marked "OneButton," and the program according to the present invention retrieves the existing contact 40 from the document, searches a database for the name of the existing contact 40 and generates a screen as shown in, for example, FIG. 10. This screen includes a message informing the user that the name corresponds to several addresses and possible contacts which already exist in the database, with existing contacts and addresses for selection 82, a message 84 including the full name and address for the contact that the user selects in 82, the Options button 66, a "Choose" button 86, a "Full details" button 88, a "More>>>" button 90, and the Cancel button 60. The above screen indicates to the user that at least one contact with the same name exists, and that there are more than one addresses and/or contacts that match.

Figure 10:
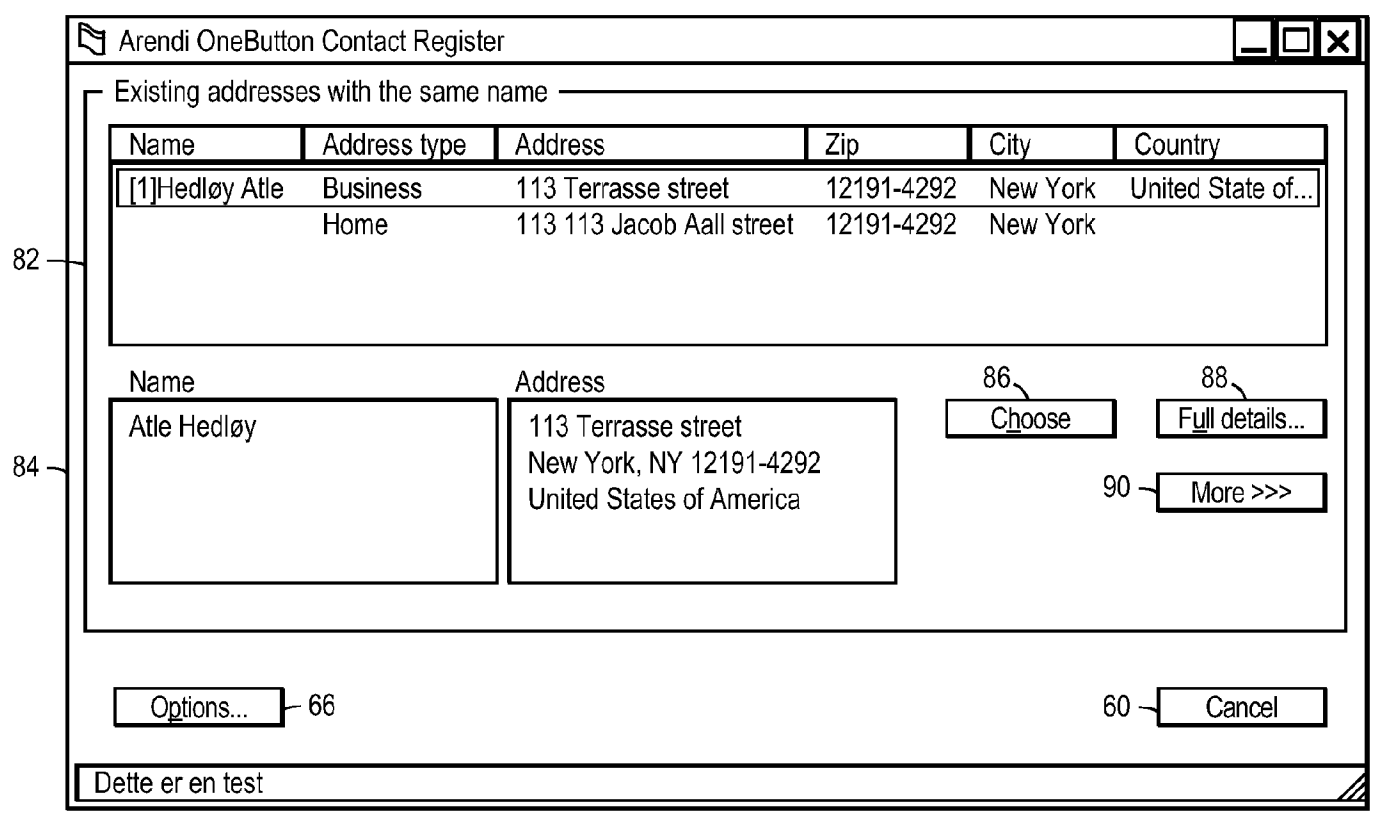
Figure 11:
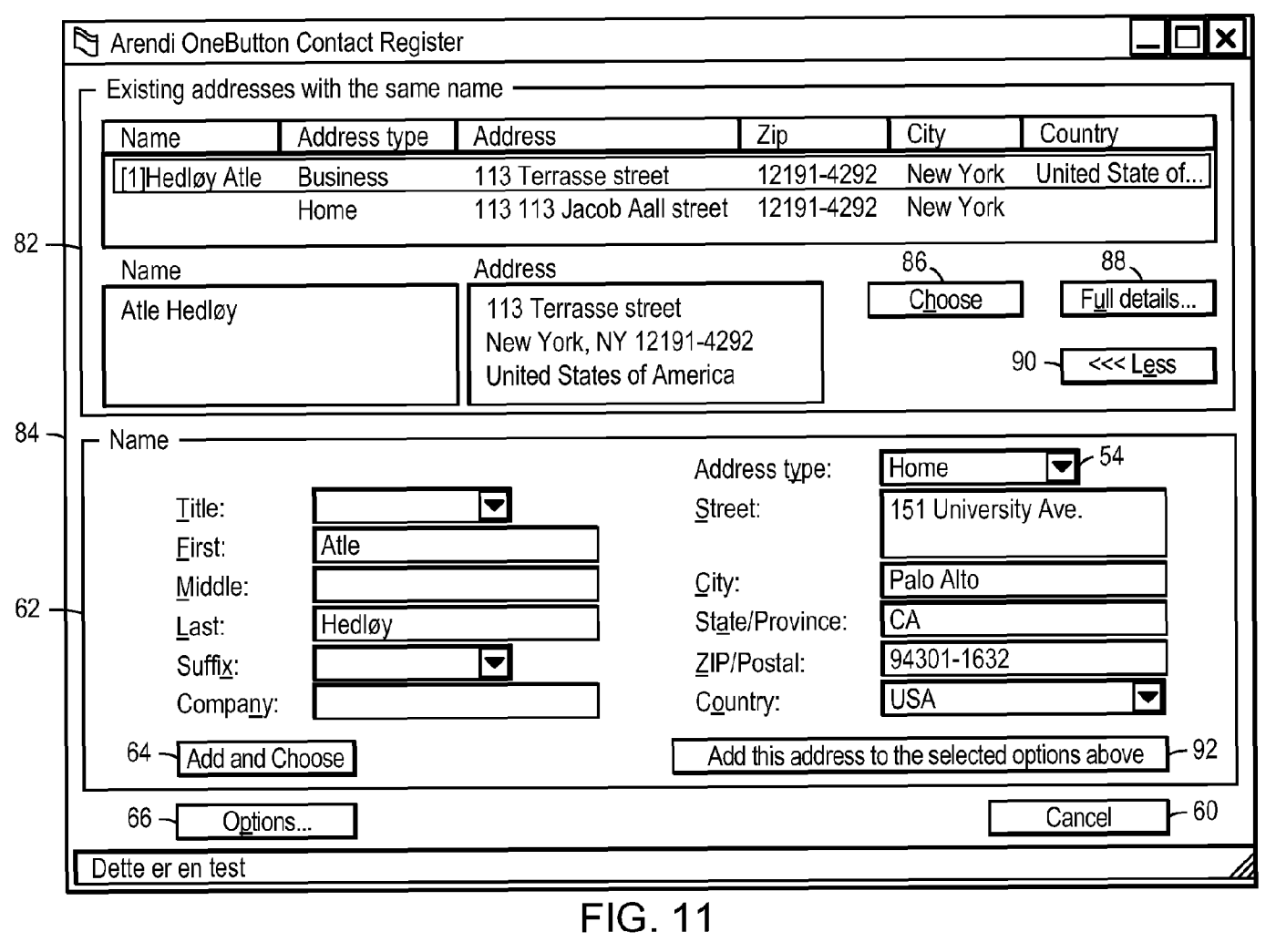

At this point, the user may command the Choose button 86 to use the selected address and return to the document, or the user may command the More>>> button 90 to view how the program interpreted what the user typed in the word processor, and possibly change this data, wherein the program generates an updated screen as shown in, for example, FIG. 11. The updated screen includes the data 62 which displays the name typed in the word processor as interpreted by the program, address fields, and the fields for the address type selection 54, such as home, business, etc., which may be changed by the user before the program stores it in the database, the Add and Choose button 64, a "<<<Less" button 90 corresponding to the More>>> button 90 for returning to the screen of FIG. 10, and an "Add this address to the selected contact above" button 92. The user might then command the Add this address to the selected contact above button 92 and the result in the word processor is illustrated in FIG. 4. The user can also cancel the operation by commanding the Cancel button 60, or command the add choose button 64 to add this name and address as a new contact and address, or open the database before storing data into the database by commanding a "Full details" button 88 as will be later described.

The above example corresponds to steps 2, 4, 6, 12, 18, 20, 22, and 16 in the flow chart of FIG. 1 and steps 2, 4, 6, 12, 18, 20, 21, 22, and 16 in the flow chart of FIG. 2.

EXAMPLE 6

Adding a New Address for an Existing Contact
(Long Version)

Figure 12:
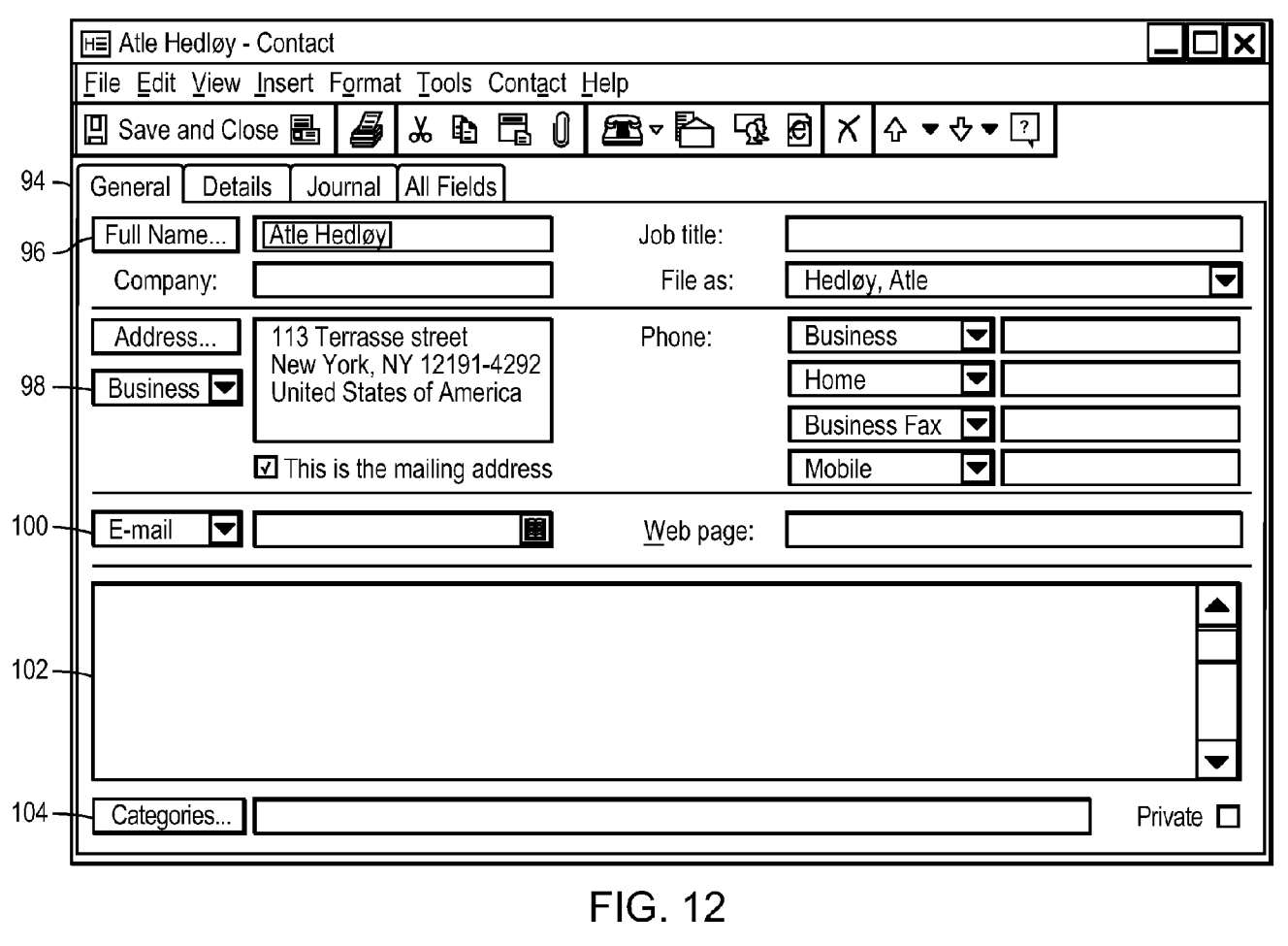

FIG. 4 illustrates a starting point in word processor document, such as a WORD™ document, wherein the user has typed a name and new address of an existing contact 44. The user commands the button 42, for example, marked "OneButton," and the program according to the present invention retrieves the existing contact 44 from the document, searches a database for the name of the existing contact 44 and generates a screen as shown in, for example, FIG. 9. As previously described, the screen includes a message 70 informing the user that the contact already exits in the database with an existing address, and the user may command the Details button 58 to see the details of the new address for potentially modify the details before they are stored in the database and the program generates a screen as shown in, for example, FIG. 10. From this screen, the user may choose to use another address than the one he typed, and return to the document, or the user may command the "Full details" button 88 to enter a database program, such as OUTLOOK™, directly as shown in, for example, FIG. 12. In FIG. 12, the database program, such as OUTLOOK™, may include portions 94-104 for allowing the user to modify various pieces of data before they are stored in the database.

Alternatively, in the screen shown in FIG. 10, the user may command the More>>> button 90 at which time the program generates the screen as shown in, for example, FIG. 11 and as previously described. In this screen, the user might then command the Add this address to the selected contact above button 92. If the address typed is already in use, the program generates a screen including a message 106, and "Yes" and "No" buttons, 108 and 110, respectively, as shown in, for example, FIG. 13. If the user hits the Yes button 108 the program overwrites the contact address with the address specified by the user (e.g., if the contact has moved) and the result in the word processor is shown in, for example, FIG. 4.

The above example corresponds to steps 2, 4, 6, 12, 14, 26, 28, 30, 34, 36, and 16 in the flow chart of FIG. 1 and steps 2, 4, 6, 12, 14, 26, 29, 31, 30, 28, 34, 36, and 16 in the flow chart of FIG. 2.

EXAMPLE 7

Spreadsheet Application

Figure 14:
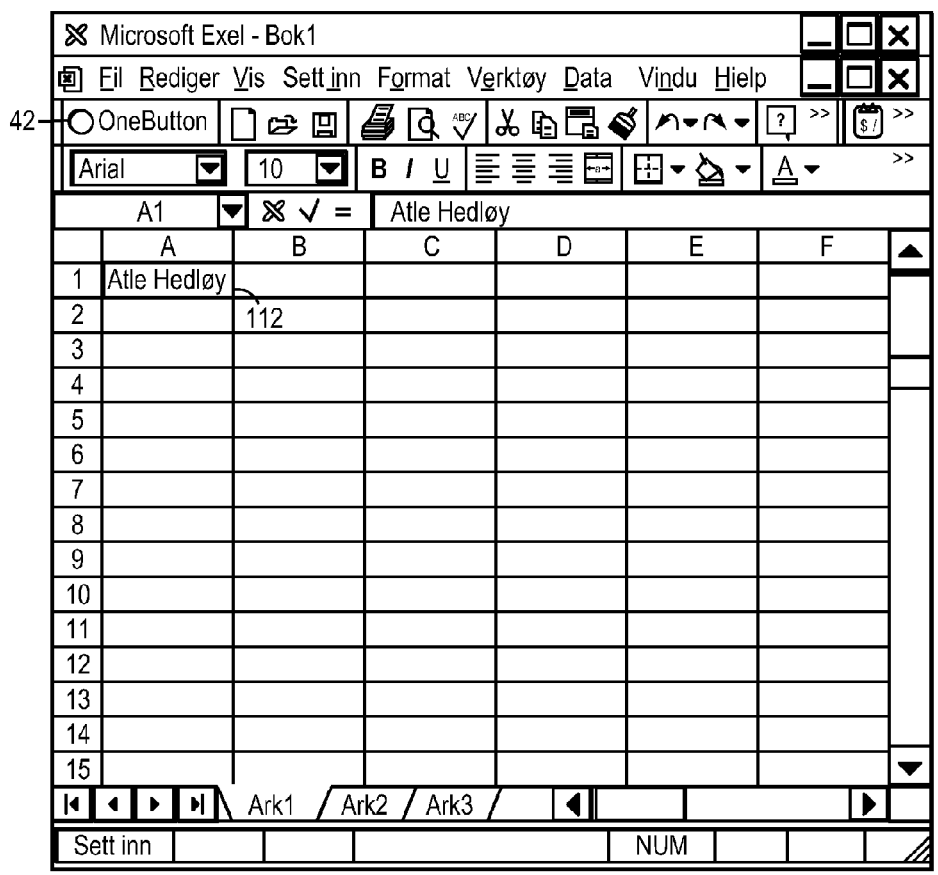
FIG. 14 is a screen shot illustrating the inputting of a name to be searched and an address handling button within a spreadsheet, according to an exemplary embodiment of the present invention.
Figure 15:
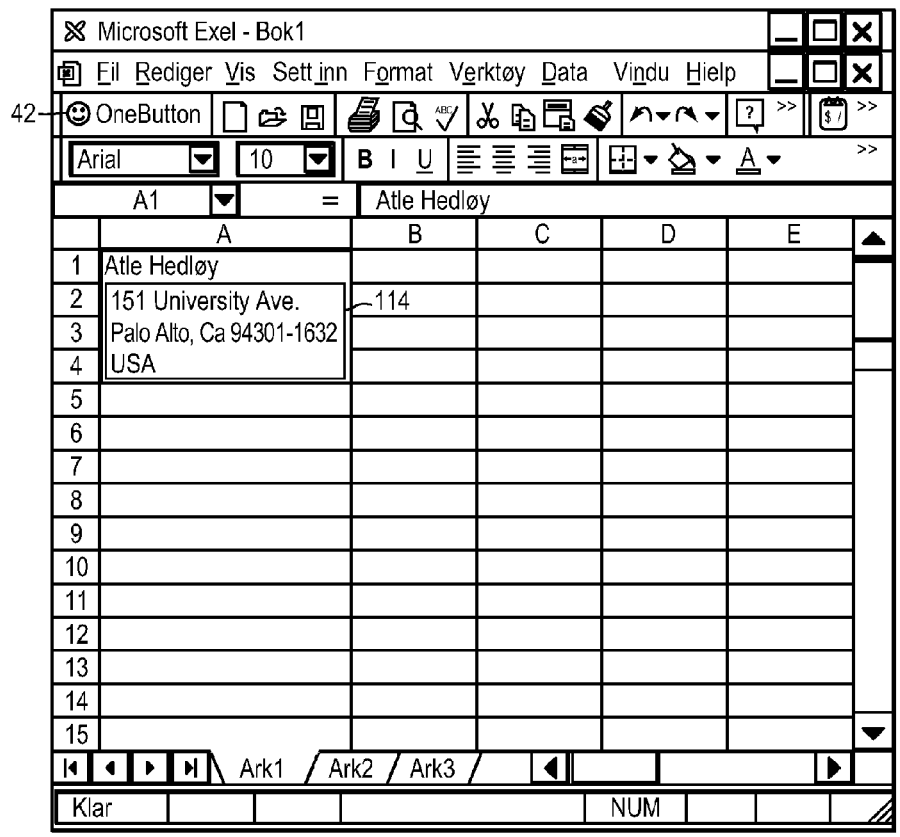
FIG. 15 is a screen shot illustrating a retrieved address in a spreadsheet, according to an exemplary embodiment of the present invention.

FIG. 14 illustrates a starting point in word processor document, such as an EXCEL™ spreadsheet, wherein the user has typed a name 112. The user hits the button 42, for example, marked "OneButton," and the program according to the present invention retrieves the name 112 from the spreadsheet, searches a database for the name 112, and inserts the retrieved address 114 into the spreadsheet as shown in, for example, FIG. 15. Accordingly, the examples 1-6 apply not only to word processor documents, such as WORD™ documents, etc., but to other word processor documents, and spread sheets, such as EXCEL™ spreadsheets, etc.

The above example corresponds to steps 2, 4, 6, 12, 18, 22 and 16 in the flow charts of FIGS. 1 and 2.

Up to this point, the single button addressing program has been described in terms of providing a device for address handling within a computer program, such as a word processor or spread sheet. The following embodiment of the single button addressing program runs on a client (e.g., a computer, cell phone, or palm top device) operating system and integrates local address and phone number data with network data, such as data obtained from an Intranet or the Internet, resolving differences and presenting them in a unified format.

The single button addressing program works within word processing, personal information management, etc., software (e.g, as previously described). The single button addressing program allows the data found on a network Intranet or Internet site to be saved in the local database and checked against network data as it changes, without the network database being aware of the local database. The network can be a public network, such as the Internet, or a private data network, such as an Intranet. The local database can be a database management system, such as Microsoft ACCESS™, Microsoft SQL server, etc., running on the local computer or any accessible server. The local database can also be an application, such as a personal information manager like Microsoft OUTLOOK™ or Symantec Act!™, etc., that maintains a database therein. Similarly, the remote database may be a public or private data service, a Web-based data source, or a CD-ROM of information used in the user's computer or computer network.

The invention according to the present embodiment performs data integration in the following way: (1) the address handling function is typically implemented as a subprogram within a larger program, such as the single button address program provided in a word processor as previously described or as single button address program provided in an operating system as will be later described; (2) the subprogram is started with a complete or partial name and address; (3) the subprogram queries the local and remote databases and compares the results; (4) the subprogram provides user interface for the user to select the appropriate result wherein the choices are marked based on whether the data is remote or local. If data was originally remote and the user saved it locally, the user is alerted if the data has changed on the remote database; (5) if the data chosen by the user is different or not present in the local database, the user is given the opportunity to save the data locally; and (6) the chosen address is returned to the calling program, which may, for example, include it in a document.

Figure 16:
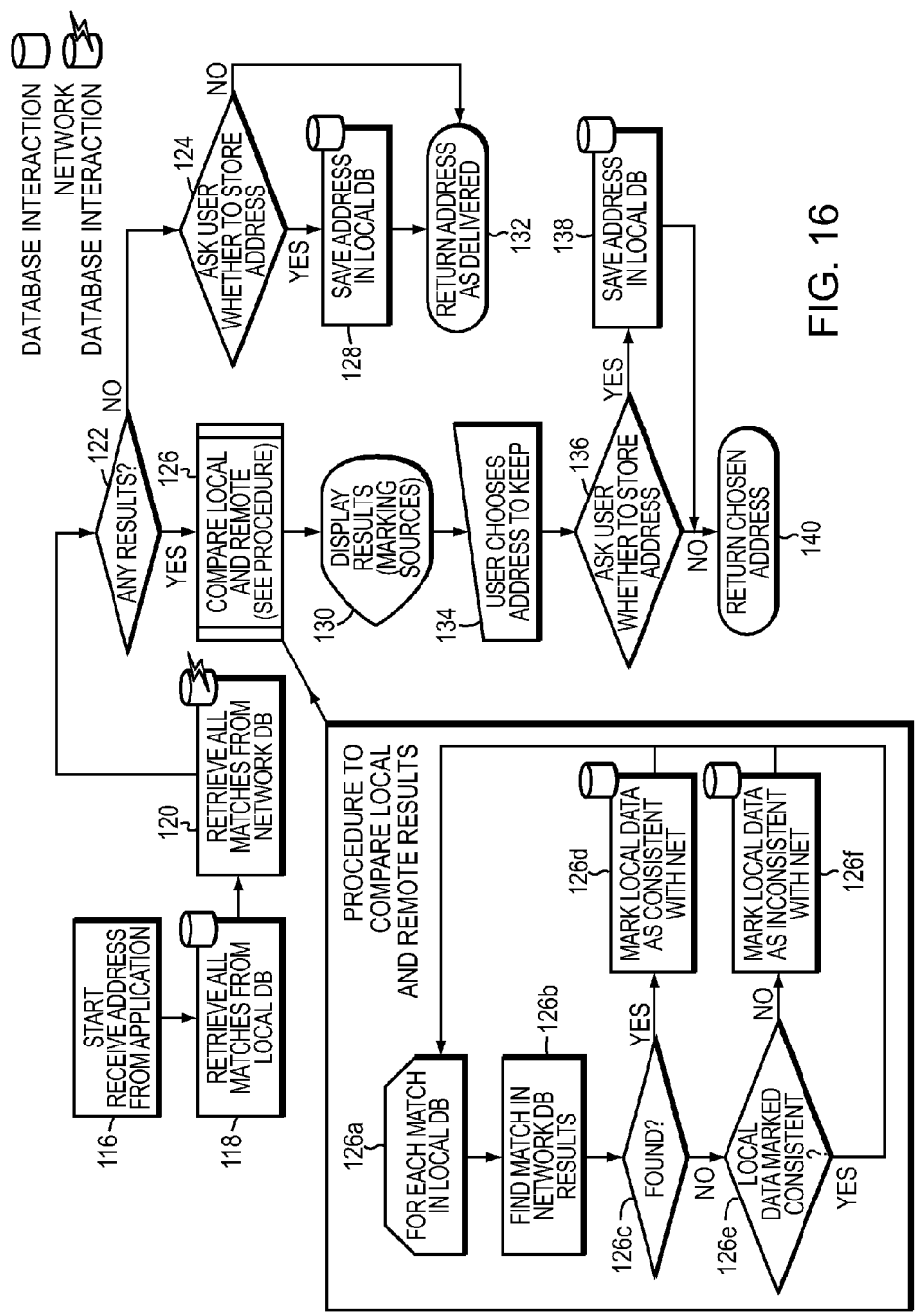
FIG. 16 is a flow chart illustrating a method for address handling within an operating system, according to another exemplary embodiment of the present invention.

FIG. 16 illustrates a method for address handling from an operating system, such as WINDOWS™ operating system, MACINTOSH™ operating system, etc., according to the present embodiment of the invention. In FIG. 16, at step 116, an address is received from an application or is entered directly into the single button addressing subprogram. At step 118, the subprogram retrieves all matches from a local database. At step 120, the subprogram retrieves all matches from a network or remote database.

At step 122, the subprogram determines whether or not there are any matching address results. If there are no matching results, the user is given the opportunity to store or not to store the address at step 124. If the user chooses to store the address, at step 128 the address is stored in the local database. If the user chooses not to store the address, at step 132 the address is returned to the calling program as delivered to the user and without being stored in the local database.

If at step 122 the subprogram determines that there are matching results, the local and remote matching database results are compared at step 126 as follows. At step 126a, for each match in the local database, step 126b determines whether or not there is a corresponding match in the remote or network database results. At step 126c, if a match is found between the local and remote databases, the matching result is marked as local data which is consistent with the network data. At step 126c, if no match is found between the local and remote databases, step 126e determines whether or no the local data was marked as consistent with the network data. If the local data was not marked as consistent with the network data, at step 126f the local data is marked as inconsistent with the network data. If the local data was marked as consistent with the network data, control transfers back to step 126a to process the next match in the local database.

Figure 17:
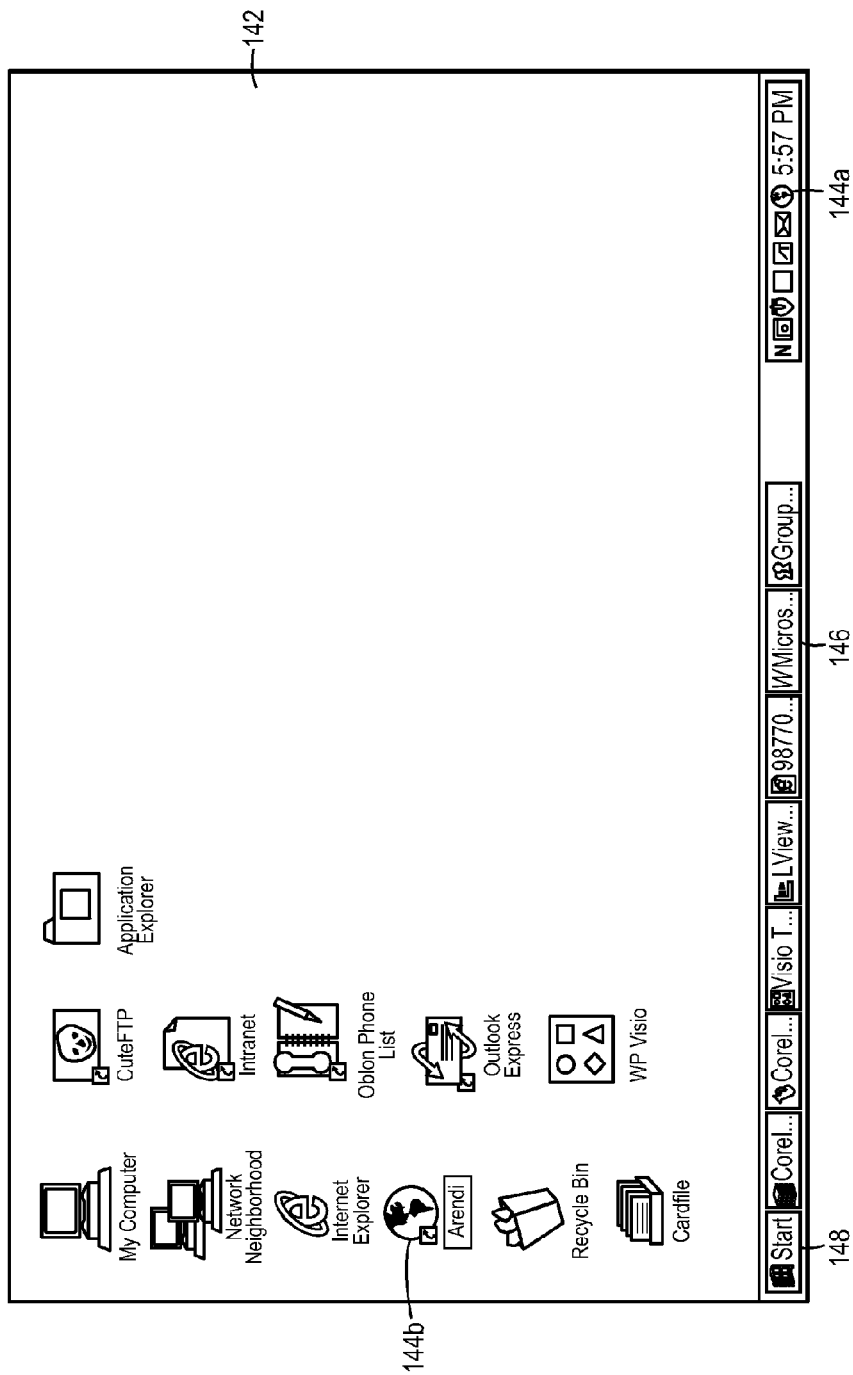
FIG. 17 is a screen shot illustrating an operating system window including means for address handling therein, according to an exemplary embodiment of the present invention.

FIG. 17, illustrates an exemplary operating system screen 142, such as a WINDOWS 95™ operating system screen, including the single button addressing subprogram implemented as tool bar subprogram 144a or as a desktop icon subprogram 144b. The single button addressing subprogram can also be launched from a word processing application 146, as previously discussed, or via the WINDOWS 95™ Start menu 148.

Figure 18:
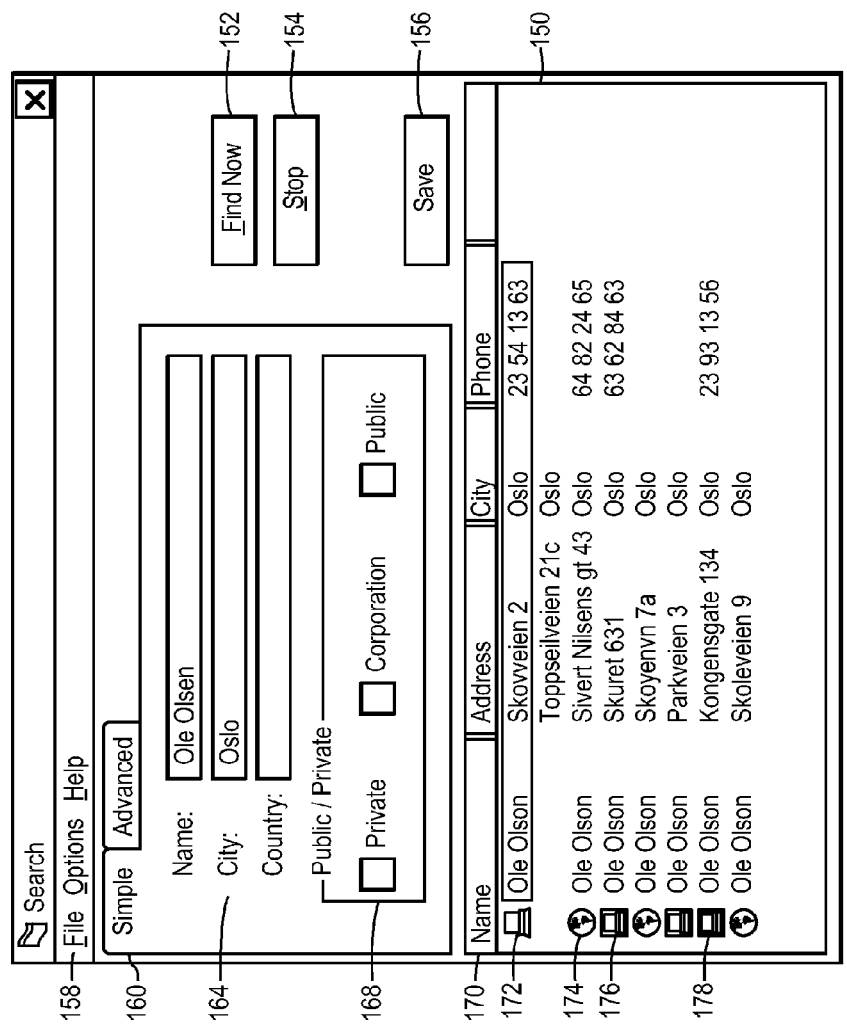
FIG. 18 is a screen shot illustrating an address handling program, according to an exemplary embodiment of the present invention.

FIG. 18 illustrates an exemplary search screen 150 generated by the single button addressing subprogram after it has been launched. In this example, a user ran a search (i.e., from the standalone single button addressing subprogram) against local data stored in, for example, Microsoft OUTLOOK™ and remote data stored in, for example, a remote web service.

In FIG. 18, the search screen 150 includes, for example, a Find Now button 152 for executing a search, a Stop button for stopping a search in progress and a Save button 156 for saving found data. The search screen 150 includes, for example, File, Option and Help menu selections 158, search criteria 164, including, for example, fields for inputting a Name, a City and/or Country, and Public/Private indicators 168, for indicating Private, Corporation and/or Public database searching options. The search results are displayed in a search window including Name, Address, City and Phone sort buttons 170, which sort the search results according to the button selected.

The search results are further marked with status indicators 172-178. Status indicator 172, for example, includes a computer icon with no color which indicates that the same data was found both locally and on the remote database (e.g., the Internet). Status indicator 174, for example, includes a globe icon which indicates that the same data was found on the remote database, but not on the local database. Status indicator 176, for example, includes a computer icon of a first color (e.g., yellow) which indicates that the same data was found on the local database, but not on the remote database. Status indicator 178, for example, includes a computer icon of a second color (e.g., red) which indicates that the data was originally added to the local database from the remote database, but now is no longer found on the remote database.

Figure 19:
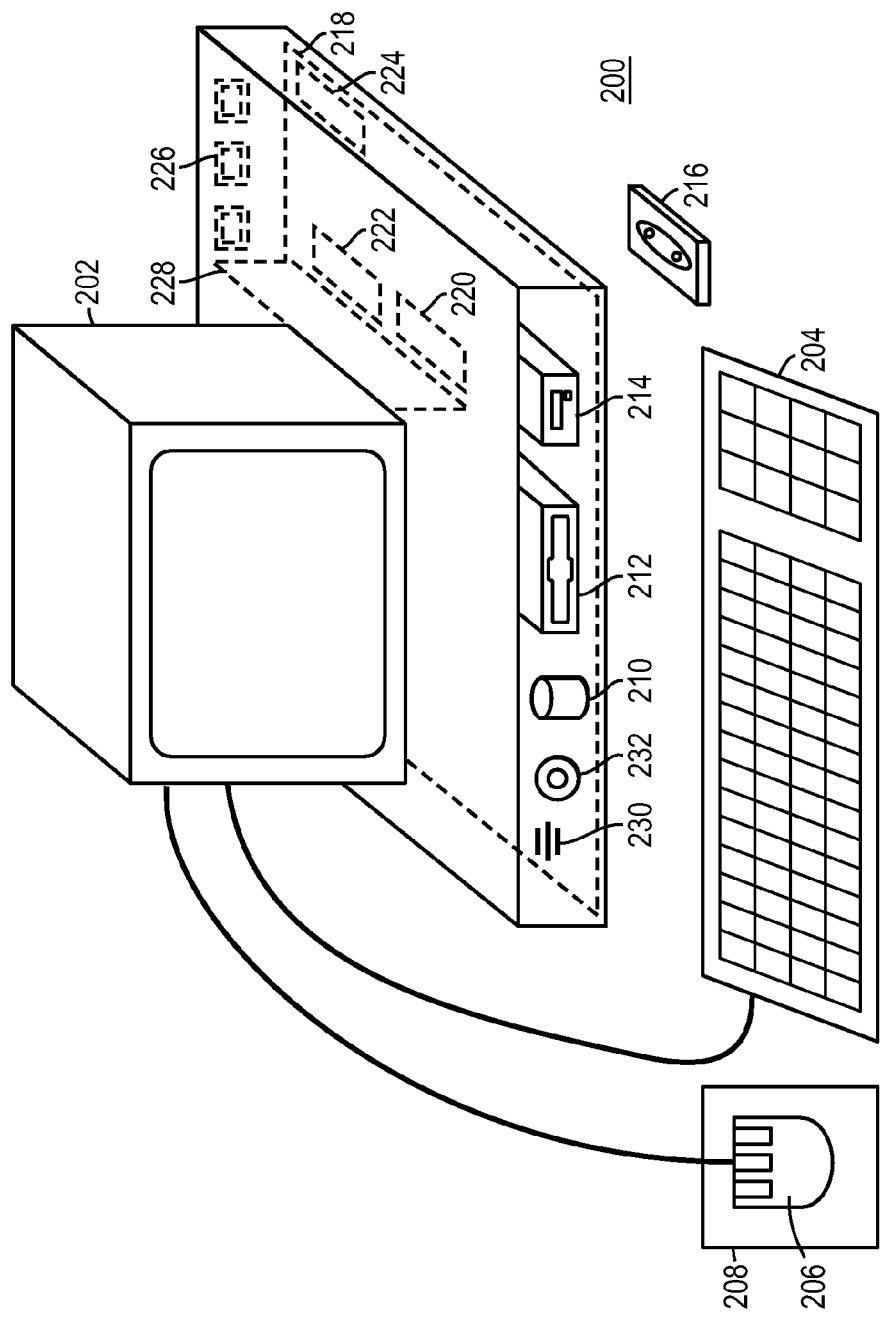
FIG. 19 is a schematic illustration of a general purpose computer for performing the processes of the present invention, according to an exemplary embodiment of the present invention.

FIG. 19 is a schematic illustration of a computer system for implementing the single button addressing according to the present invention. A computer 200 implements the method of the present invention, wherein the computer includes, for example, a display device 202, such as a conventional display device or a touch screen monitor with a touch-screen interface, etc., a keyboard 204, a pointing device 206, a mouse pad or digitizing pad 208, a hard disk 210, or other fixed, high density media drives, connected using an appropriate device bus (e.g., a SCSI bus, an Enhanced IDE bus, an Ultra DMA bus, a PCI bus, etc.), a floppy drive 212, a tape or CD ROM drive 214 with tape or CD media 216, or other removable media devices, such as magneto-optical media, etc., and a mother board 218. The mother board 218 includes, for example, a processor 220, a RAM 222, and a ROM 224 (e.g., DRAM, ROM, EPROM, EEPROM, SRAM, SDRAM, and Flash RAM, etc.), I/O ports 226 which may be used to couple to external devices, networks, etc., (not shown), and optional special purpose logic devices (e.g., ASICs) or configurable logic devices (e.g., GAL and re-programmable FPGA) 228 for performing specialized hardware/software functions, such as sound processing, image processing, signal processing, neural network processing, object character recognition (OCR) processing, etc., a microphone 230, and a speaker or speakers 232.

As stated above, the system includes at least one computer readable medium, or alternatively, the computer readable medium may be accessed through various paths, such as networks, internet, drives, etc. Examples of computer readable media are compact discs, hard disks, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 200 and for enabling the computer 200 to interact with a human user. Such software may include, but is not limited to, device drivers, operating systems and user applications, such as development tools. Such computer readable media further includes the computer program product of the present invention for performing any of the processes according to the present invention, described above (see, e.g., FIGS. 1-18). The computer code devices of the present invention can be any interpreted or executable code mechanism, including but not limited to scripts, interpreters, dynamic link libraries, Java classes, and complete executable programs, etc.

The invention may also be implemented by the preparation of application specific integrated circuits or by interconnecting an appropriate network of conventional component circuits, as will be readily apparent to those skilled in the art.

Address handling, according to this invention, is a significant simplification relative to existing methods, and requires little or no training on the part of a user, as correct addresses are retrieved with a minimal number of user commands, "clicks", keystrokes, etc. In addition, a program according to the present invention, can be programmed and created in most existing programming languages and be connected to most modern word processors. Therefore, according to the present invention, the process of creating and updating records in an address database is significantly simplified, since this may now be performed directly from the word processor.

Although the present invention is defined in terms of word processing documents, such as WORD™ documents and EXCEL™ spreadsheets, the present invention is applicable to all types of word processing documents, such as NOTEPAD™, WORDPAD™, WORDPERFECT™, QUATROPRO™, AMIPRO™, etc., as will be readily apparent to those skilled in the art.

Although the present invention is defined in terms of information management or database programs, such as OUTLOOK™, etc., the present invention is applicable to all types of information management or database programs, such as ACCESS™, ORACLE™, DBASE™, RBASE™, CARDFILE™, including "flat files," etc., as will be readily apparent to those skilled in the art.

Although the present invention is defined in terms of operating systems, such as WINDOWS™, MACINTOSH™, etc., the present invention is applicable to all types of operating systems, such as UNIX™, LINUX™, etc., as will be readily apparent to those skilled in the art.

Although the present invention is defined in terms of providing an input device, such as a button 42 in a word processor for address handling therein, the present invention may be practiced with all types of input devices, such as a touch screen, keyboard button, icon, menu, voice command device, etc., as will be readily apparent to those skilled in the art.

Although the present invention is defined in terms of a program retrieving information from a document before searching a database, the user may select the information in the document to be searched by the program in the database (e.g., by highlighting, selecting, italicizing, underlining, etc.), as will be readily apparent to those skilled in the art.

Although the present invention is defined in terms of a program retrieving a name or portion thereof from a document before searching a database, the program may retrieve an address or portion thereof from the document before searching the database and insert, correct, complete, etc., the retrieved address based on the information found in the database corresponding to the retrieved address or portion thereof, as will be readily apparent to those skilled in the art.

Although the present invention is defined in terms of an embodiment as described with respect to FIGS. 16-18, all of the relevant features as described with respect to FIGS. 1-15 apply to the embodiment as described with respect to FIGS. 16-18, as will be readily apparent to those skilled in the art. Similarly, although the present invention is defined in terms of an embodiment as described with respect to FIGS. 1-15, all of the relevant features as described with respect to FIGS. 16-18 apply to the embodiment as described with respect to FIGS. 1-15, as will be readily apparent to those skilled in the art.

Although the present invention is defined in terms of an address handling program provided in an operating system environment, such as WINDOWS™, MACINTOSH™, etc., of a personal computer, the program may run on an operating system environment, such as WINDOWS CE™, etc., of a client, such as cell phone, palm top device, personal organizer, etc., as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

This application claims priority and contains subject matter related to Norwegian patent application No. 984066 filed on Sep. 3, 1998, the entire contents of which are hereby incorporated by reference.

What is claimed is:

1. A method for providing information, for display on a client, related to text displayed by a pre-existing application program running on the client, the method comprising:

providing, in electronic data format, criteria for electronic analysis of the text being displayed on the client in order to identify at least one part of the text as first information being associated with second information that is in an information source accessible by the client via the internet, the criteria being sufficient, when applied to the text, for the analysis to identify the first information without any need for prior human designation of text comprising the first information, and wherein (i) the criteria comprise comparing parts of the text being displayed to elements in at least one list comprising textual elements, and, if a part of the text being displayed includes at least one of the elements, such part is considered first information, and (ii) the second information depends on textual content of the first information;

providing to the client a computer code device for the pre-existing application program displaying the text, wherein the computer code device is stored on a computer readable medium and made accessible via the internet to the client, and the computer code device is configured (1) to provide within the pre-existing application program an input device configured to enable entry of an execute command at the client, (2) upon receipt of the execute command, to cause retrieval of the second information, and (3) after such retrieval, to cause display of the second information in a window on the client; and using the computer code device to cause, in response to receipt of the execute command, delivery via the internet to the client of the second information for display in a window on the client.

2. The method of claim 1, wherein the window comprises a second input device that may be selected by the user to see additional information related to the second information and upon receipt of a user selection of the second input device, providing, via the internet, the additional information.

3. The method of claim 1, wherein the computer code device directs marking the first information to alert the user that the first information is associated with second information in the information source.

4. The method of claim 1, wherein the second information from the information source is related to a company.

5. The method of claim 1, wherein the first information comprises an address.

6. The method of claim 5, wherein the second information from the information source comprises at least one of a name of a person associated with the address and a name of a company associated with the address.

7. The method of claim 1, wherein the client is at least one of a personal computer, a cell phone, a palm top device, and a personal organizer.

8. At least one non-transitory computer-readable medium encoded with instructions which when loaded on at least one computer, establish processes for providing information, for display on a client, related to text displayed by a pre-existing application program running on the client, the processes comprising:

providing, in electronic data format, criteria for electronic analysis of the text being displayed on the client in order to identify at least one part of the text as first information being associated with second information that is in an information source accessible by the client via the internet, the criteria being sufficient, when applied to the text, for the analysis to identify the first information without any need for prior human designation of text comprising the first information, and wherein (i) the criteria comprise comparing parts of the text being displayed to elements in at least one list comprising textual elements, and, if a part of the text being displayed includes at least one of the elements, such part is considered first information, and (ii) the second information depends on textual content of the first information;

providing to the client a computer code device for the pre-existing application program displaying the text, wherein the computer code device is stored on a computer readable medium and made accessible via the internet to the client, and the computer code device is configured (1) to provide within the pre-existing application program an input device configured to enable entry of an execute command at the client, (2) upon receipt of the execute command, to cause retrieval of the second information, and (3) after such retrieval, to cause display of the second information in a window on the client; and using the computer code device to cause, in response to receipt of the execute command, delivery via the internet to the client of the second information for display in a window on the client.

9. The at least one non-transitory computer-readable medium of claim 8, wherein the window comprises a second input device that may be selected by the user to see additional information related to the second information and upon receipt of a user selection of the second input device, providing, via the internet, the additional information.

10. The at least one non-transitory computer-readable medium of claim 8, wherein the computer code device directs marking the first information to alert the user that the first information is associated with second information in the information source.

11. The at least one non-transitory computer-readable medium of claim 8, wherein the second information from the information source is related to a company.

12. The at least one non-transitory computer-readable medium of claim 8, wherein the first information comprises an address.

13. The at least one non-transitory computer-readable medium of claim 12, wherein the second information from the information source comprises at least one of a name of a person associated with the address and a name of a company associated with the address.

14. The at least one non-transitory computer-readable medium of claim 8, wherein the client is at least one of a personal computer, a cell phone, a palm top device, and a personal organizer.

* * * * *